US010594425B2

(12) United States Patent
Grant et al.

(10) Patent No.: US 10,594,425 B2
(45) Date of Patent: Mar. 17, 2020

(54) MULTI-ACCESS COMMUNICATION SYSTEM

(71) Applicant: University of South Australia, Adelaide (AU)

(72) Inventors: Alexander James Grant, Adelaide (AU); David Victor Lawrie Haley, Adelaide (AU); Robert George McKilliam, Adelaide (AU); William George Cowley, Adelaide (AU); Ho Leung Chan, Adelaide (AU)

(73) Assignee: Myriota Pty Ltd, Adelaide, South Australia (AU)

( * ) Notice: Subject to any disclaimer, the term of this patent is extended or adjusted under 35 U.S.C. 154(b) by 90 days.

(21) Appl. No.: 15/497,188

(22) Filed: Apr. 25, 2017

(65) Prior Publication Data

US 2017/0230130 A1 Aug. 10, 2017

Related U.S. Application Data

(63) Continuation of application No. 14/430,100, filed as application No. PCT/AU2013/001079 on Sep. 20, 2013, now Pat. No. 9,668,210.

(30) Foreign Application Priority Data

Sep. 21, 2012 (AU) .................................. 2012904145

(51) Int. Cl.
*H04J 11/00* (2006.01)
*H04W 52/02* (2009.01)
(Continued)

(52) U.S. Cl.
CPC .......... *H04J 11/0036* (2013.01); *H04B 7/212* (2013.01); *H04L 5/0055* (2013.01);
(Continued)

(58) Field of Classification Search
CPC .................................................. H04J 11/0036
See application file for complete search history.

(56) References Cited

U.S. PATENT DOCUMENTS

2003/0003905 A1* 1/2003 Shvodian ............. H04L 1/0001
455/423
2004/0014452 A1* 1/2004 Lim ................... H04B 7/18558
455/403

(Continued)

FOREIGN PATENT DOCUMENTS

CA 2724013 A1 6/2011
EP 1327316 B1 12/2013
(Continued)

OTHER PUBLICATIONS

Extended European Search Report issued in co-pending European Patent Application No. 13839467.1, European Patent Office, dated Apr. 26, 2016, 7 pages.

(Continued)

*Primary Examiner* — John D Blanton
(74) *Attorney, Agent, or Firm* — McDonnell Boehnen Hulbert & Berghoff LLP

(57) ABSTRACT

A multiple access slotted wireless communication system comprising a plurality of terminals and a multi-access receiver is described. The multi-access receiver can decode multiple transmissions in each slot of a frame from terminals in its field of view. Each terminal has an active state for transmitting and an inactive state. After receiving acknowledgement of a successful transmission by the terminal, the terminal enters the inactive state for at least a transmission delay time. This may be the remaining time that the terminal is in the field of view of the multi-access receiver. This may be achieved by the terminal using a probability of transmission to determine whether or not to transmit in the next frame. The terminal may also be configured to select the slot (Continued)

in a frame, and this may be based upon information such as which slots were acknowledged. The receiver may use compression to transmit acknowledgement messages.

14 Claims, 7 Drawing Sheets

(51) Int. Cl.
*H04B 7/212* (2006.01)
*H04L 5/00* (2006.01)
*H04W 72/04* (2009.01)
*G08C 17/02* (2006.01)
*H04B 7/204* (2006.01)
*H04J 1/00* (2006.01)

(52) U.S. Cl.
CPC ..... *H04W 52/028* (2013.01); *H04W 52/0216* (2013.01); *H04W 52/0229* (2013.01); *H04W 52/0241* (2013.01); *H04W 72/0446* (2013.01); *G08C 17/02* (2013.01); *H04B 7/204* (2013.01); *H04J 1/00* (2013.01); *H04J 2011/0013* (2013.01); *H04W 52/02* (2013.01); *H04W 72/04* (2013.01); *Y02D 70/164* (2018.01); *Y02D 70/446* (2018.01)

(56) References Cited

U.S. PATENT DOCUMENTS

| | | |
|---|---|---|
| 2005/0043027 A1* | 2/2005 | Emeott ............ H04W 52/0229 455/435.1 |
| 2007/0150565 A1 | 6/2007 | Ayyagari et al. |
| 2010/0195557 A1 | 8/2010 | Aoki |
| 2010/0254392 A1 | 10/2010 | Katar et al. |
| 2011/0295102 A1* | 12/2011 | Lakkis .................... A61B 5/00 600/407 |
| 2012/0092155 A1 | 4/2012 | Abedi |
| 2012/0155284 A1 | 6/2012 | Shaffer |
| 2012/0172078 A1 | 7/2012 | Olsen et al. |

FOREIGN PATENT DOCUMENTS

| | | |
|---|---|---|
| WO | 91/13503 A1 | 9/1991 |
| WO | WO 02/39622 A1 | 5/2002 |
| WO | 03/036821 A1 | 5/2003 |

OTHER PUBLICATIONS

Ahlswede et al., "Identification via Channels," IEEE Transactions on Information Theory, vol. 35, No. 1, Jan. 1989, pp. 15-29.
International Preliminary Report on Patentability for PCT/AU2013/001079 dated Mar. 24, 2015, pp. 1-10.

* cited by examiner

MULTI-ACCESS COMMUNICATION SYSTEM

CROSS-REFERENCE TO RELATED APPLICATIONS

This application is a Continuation Application of U.S. patent application Ser. No. 14/430,100, filed Mar. 20, 2015, which is a National Stage Application of International Patent Application No. PCT/AU2013/001079, filed Sep. 20, 2013, which claims the benefit of, and priority to, Australian Provisional Patent Application No. 2012904145, filed Sep. 21, 2012. The contents of these applications are incorporated entirely herein by reference.

INCORPORATION BY REFERENCE

The following patent applications are referred to in the following description:

International Patent Application No PCT/AU2013/000895 titled "CHANNEL ALLOCATION IN A COMMUNICATION SYSTEM" filed on 14 Aug. 2013 by the University of South Australia;

Australian Provisional Patent Application No. 2013903163 titled "MULTIUSER COMMUNICATION SYSTEM" filed on 21 Aug. 2013 by the University of South Australia; and Australian Provisional Patent Application No. 2012903489 titled "COMMUNICATION SYSTEM AND METHOD" filed on 21 Sep. 2012 by the University of South Australia.

The content of each of these applications is hereby incorporated by reference in their entirety.

TECHNICAL FIELD

The present invention relates to wireless communication systems. In a particular form the present invention relates to communication methods for multi-access communication systems.

BACKGROUND

Cost effective communications to terrestrial and maritime field sensors, and industrial automation and control equipment, has the potential to deliver significant economic and environmental benefits in areas such as environmental monitoring for climate change, water, mining, agriculture, defence and national security. Many of these high-value applications have modest data rate requirements (kilobits per second), and can tolerate intermittent communications with latency up to several hours. Frequently, applications involve sensors in very remote areas where terrestrial communication solutions do not exist, are unreliable, are denied or insecure (eg in a defence context). These constraints mandate the use of communication systems in which multi-access (or multi-user) receivers are located in satellites or similar mobile platforms (eg unmanned aerial vehicles, or maritime vessels).

In such systems, the terminals may be stationary (at a fixed location), or they may be mobile (eg portable, or fitted to a vehicle, aircraft or vessel, or space vehicle, or carried by a person or animal). Thus, in such systems the number of terminals in the field of view can vary due to either movement of the receiver or terminals, or due to receivers only being intermittently in an active state (ready for transmission).

However, in the past, the combination of prohibitive cost and technical constraints of such satellite systems have typically limited the widespread use of such systems for communication with large numbers of remote field sensors. In particular, past systems have typically been one-way communications systems for very small amounts of data. Such one-way systems are also referred to as open-loop systems, as there is no feedback between the receiver and the terminals (ie terminals transmit, receivers listen). One problem with such open-loop systems is that each transmitting terminal does not know if its transmission was successful. Thus, the terminal remains active, and constantly repeats its transmission, whilst the receiver is in the field of view. This results in inefficient use of the available physical communication medium, and can significantly increase the number of packets which are not received due to multiuser receiver failures. Furthermore, the terminals may not even know when they are in the field of view of a receiver, and may unnecessarily transmit signals which cannot be received at all by any receiver. This reduces the energy efficiency of the terminals, which may be important when terminals are remotely located battery powered terminals.

There is thus a need to provide communications methods, components, and systems for improving system performance in such communication systems, or alternatively to at least provide users with a useful alternative.

SUMMARY

According to a first aspect, there is provided a method for operation of a terminal in a multiple access slotted wireless communication system comprising a plurality of terminals and a multi-access receiver which communicate using a frame comprising a plurality of slots, wherein each terminal has an active state for transmitting, and an inactive state during which the terminal is prevented from transmitting, and the multi-access receiver has a first field of view and is configured to successfully decode up to m transmissions in each slot of a frame from terminals in the field of view, the method comprising:

transmitting a message during a slot of a frame;

receiving one or more acknowledgement messages;

determining, using the received one or more acknowledgement messages, if the transmitted message was successfully received by the multi-access receiver; and entering an inactive state for at least a transmission delay time if the terminal determines that the transmitted message was successfully received.

In one form, the transmission delay time is at least the remaining time that the terminal is in the field of view of the multi-access receiver.

In one form, the one or more acknowledgement messages are all positive acknowledgement (ACK) messages, and determining if the transmitted message was successfully received by the multi-access receiver comprises receiving an acknowledgement message directed to the terminal.

In one form, the one or more acknowledgement messages are all negative acknowledgement (NACK) messages, and determining if the transmitted message was successfully received by the multi-access receiver comprises not receiving an acknowledgement message directed to the terminal.

In one form, the one or more acknowledgement messages are transmitted prior to the start of transmissions in the next slot of the frame.

In one form, the at least one acknowledgement message is a slot acknowledgement message comprising a common acknowledgement state for all transmissions in the slot. The slot acknowledgment message may comprise a slot identifier. In one form the frame comprises n slots, and the one or more acknowledgement messages comprises L slot acknowledgment messages (where L≤n), and each L slot acknowledgement message comprises either a n bit message in which each bit corresponds to a slot, a L log$_2$ n bit message comprising a log$_2$ n bit identifier for each of the L slots to be acknowledged, or $$\left( L \log_2 n + \log_2 \binom{n}{L} \right)$$

bit message comprising the number of slots L to be acknowledged, followed by an identifier of the particular subset of L slots, and the terminal determines if the transmitted message was successfully received by the multi-access receiver by determining if a slot identifier of the slot the message was transmitted in is in the one of the received slot acknowledgment messages.

In one form, wherein the transmitted message comprises a terminal identifier, and at least one of the one or more acknowledgement messages are a terminal specific acknowledgement message comprising the terminal identifier and the terminal uses the terminal specific acknowledgement message to determine if the transmitted message was successfully received by the multi-access receiver.

In one form, receiving the one or more acknowledgement messages further comprises:

receiving a hashing function h which generates a binary value output when provided with the terminal identifier, wherein the hashing function is generated such that when a terminal identifier in a set of terminals to be acknowledged is input, the hashing function outputs a first binary value, and if an input terminal identifier is not in the set of terminals to be acknowledged the hashing function generates a complementary binary value output, and the step of transmitting one or more acknowledgement messages comprises transmitting the hashing function, and the step of determining transmitted message was successfully received by the multi-access receiver comprises providing the terminal identified to the hashing function and using the binary value output to determine if the transmitted message was successfully received.

In one form, the first binary value is zero and the hashing function is a binary matrix M with log$_2$ K$_{total}$ columns and l columns where the system comprises K$_{total}$ terminals such that the matrix-vector modulo-2 multiplication Mb(i)=0 where b(i) is a length log$_2$ K$_{total}$ binary vector containing the binary expansion of the integer i, and the right hand side is a length l all zero vector, and the terminal identifier is the integer i.

In one form, the method further comprises the following steps before the step of transmitting a message during a slot of a frame:

determining whether to transmit a message in a frame; and selecting a slot in the frame and the step of transmitting a message during a slot of a frame comprises transmitting the message in the selected slot of the frame.

In one form, determining whether to transmit a message in a frame, is determined using a probability of transmitting, p. The probability of transmitting, p may increase after each unsuccessful transmission. The probability of transmitting, p may be set to zero for the transmission delay time and the probability of transmitting, p may increase with time after the end of the transmission delay time.

In one form, the step of selecting a slot in the frame, comprises:

determining if the terminal unsuccessfully transmitted a message in a slot of a previous frame, and if the terminal was unsuccessful then selecting the corresponding slot in the next frame.

In one form, the acknowledgement messages are NACK messages and the step of selecting a slot in the frame, comprises:

receiving one or more NACK messages sent in a previous frame before the frame that a slot is to be selected in;

determining a set of available slots in the frame that a slot is to be selected in, by taking the set of all slots in the frame and excluding each slot in the frame for which a NACK message was associated with the corresponding slot in the previous frame; and selecting a slot from the set of available slots.

In one form, the terminal further comprises a wait state and the method further comprises:

monitoring a communication channel to determine if the terminal is in the field of view of the multi-access receiver, and upon detection of the multi-access receiver by the terminal whilst in the wait state, the terminal enters either an active state if the terminal has a message to send to the multi-access receiver, or an inactive state if the terminal does not have a message to send to the multi-access receiver, and if a terminal in the active state or inactive state does not detect the multi-access receiver, the terminal enters the wait state.

In one form, the multi-access receiver transmits a beacon signal in the communication channel and the step of monitoring a communication channel further comprises:

monitoring the communication channel for the beacon.

In one form, the multi-access receiver follows a known trajectory, and the method further comprises:

determining if the terminal is in the field of view of the multi-access receiver based upon the current time, the location of the terminal and known trajectory of the multi-access receiver, and if the terminal determines it is in the field of view and the terminal is in the wait state, then the terminal enters either an active state if the terminal has a message to send to the multi-access receiver, or an inactive state if the terminal does not have a message to send to the multi-access receiver, and if a terminal in the inactive state and determines it is not in the field of view then the terminal enters the wait state.

According to a second aspect, there is provided a method for operation of a multi user receiver in a multiple access wireless communication system comprising a plurality of terminals, the multi user receiver comprising a receiver for simultaneously receive m transmissions in each slot of a frame from the plurality of terminals, and a multiuser decoder for decoding the received transmissions, the method comprising:

receiving one or more transmissions from one or more terminals;

attempting to decode the received one or more transmissions and obtaining an estimate of the likelihood of successfully decoding each received transmission;

transmitting one or more acknowledgement messages, wherein one or more of the acknowledgement messages are a predictive acknowledgement based upon the likelihood estimates.

In one form, full decoding of a received transmission is delayed until after sending the predictive acknowledgement message.

According to a third aspect, there is provided a method for operation of a multi user receiver in a multiple access wireless communication system comprising a plurality of terminals, the multi user receiver comprising a receiver for simultaneously receive m transmissions in each slot of a frame from the plurality of terminals, and a multiuser decoder for decoding the received transmissions, and the frame comprises n slots, the method comprising:

receiving one or more transmissions from one or more terminals;

attempting to decode the received one or more transmissions;

generating one or more compressed acknowledgement messages; and transmitting the one or more compressed acknowledgement messages.

In a further form, generating one or more compressed acknowledgement messages comprises:

generating L slot acknowledgment messages (where L≤n), and each L slot acknowledgement message comprises either a n bit message in which each bit corresponds to a slot, a L $\log_2$ n bit message comprising a $\log_2$ n bit identifier for each of the L slots to be acknowledged, or $$\left(L\log_2 n + \log_2\binom{n}{L}\right)$$

bit message comprising the number of slots L to be acknowledged, followed by an identifier of the particular subset of L slots, and transmitting the one or more compressed acknowledgement messages comprises transmitting the L slot acknowledgment messages.

In a further form, each transmission includes a terminal identifier and generating one or more compressed acknowledgement messages comprises:

generating a hashing function h which generates a binary value output when provided with the terminal identifier, wherein the hashing function is generated such that when a terminal identifier in a set of terminals to be acknowledged is input, the hashing function outputs a first binary value, and if an input terminal identifier is not in the set of terminals to be acknowledged the hashing function generates a complementary binary value output, and the step of transmitting one or more compressed acknowledgement messages comprises transmitting the hashing function.

In a further form, the first binary value is zero and the hashing function is a binary matrix M with $\log_2 K_{total}$ columns and l columns where the system comprises $K_{total}$ terminals such that the matrix-vector modulo-2 multiplication Mb(i)=0 where b(i) is a length $\log_2 K_{total}$ binary vector containing the binary expansion of the integer i, and the right hand side is a length l all zero vector.

In a further form, the size of the hashing function is selected on the basis of a hash collision probability being less than a collision threshold, and the hash collision probability is estimated based upon the expected number of terminals in the field of view of the receiver.

According to a fourth aspect, there is provided a multi user receiver for use in a multiple access wireless communication system comprising a plurality of terminals, the multi user receiver comprising a receiver for simultaneously receiving m transmissions in each slot of a frame and a multiuser decoder for decoding the received transmissions, and the multi-access receiver is configured to perform the method of the first aspect.

According to a fifth aspect, there is provided a terminal for use in a multiple access wireless communication system comprising a plurality of terminals, the terminal comprising a transmitter and the multi user receiver comprising a receiver for simultaneously receive m transmissions in each slot of a frame and a multiuser decoder for decoding the received transmissions, and the terminal is configured to perform the method of the second aspect.

According to a sixth aspect, there is provided a multiple access wireless communication system comprising a plurality of terminals configured according to the third aspect and a multi-access receiver configured to according to the second aspect.

According to a seventh aspect, there is provided a method for optimizing a network parameter in a set of network parameters in a multiple access wireless communication system comprising a plurality of terminals and a multi-access receiver which communicates using a frame comprising a plurality of slots, wherein each terminal has an active state for transmitting, and an inactive state during which the terminal is prevented from transmitting, and the multi-access receiver has a first field of view and is configured to successfully decode up to m transmissions in each slot of a frame from terminals in the field of view, wherein the network parameters comprise (p, n, m, $\epsilon$) where p, n, m, $\epsilon$ is the probability of an active terminal deciding to transmit in a frame, n is the number of slots per frame, m is the number of simultaneous transmissions that a multiuser can successfully decode in a single slot, and E is the probability of failure of a terminal to successfully transmit a message whilst in a field of view of the multiple access receiver, and the method of optimising a network parameter comprising:

selecting a network parameter and numerically solving q=1-pQ(m,λ) and $$K_0 = \frac{1-\varepsilon^{1/F}}{1-\varepsilon}\lambda^* n$$

to optimise λ* where q is the proportion of terminals that succeed in transmitting in a frame and Q is the gamma function, $K_0$ is the number of new terminals that enter the field of view each frame, F is the number of frames a terminal is in the field of view for, λ=k/n and k=pK and where K is the number of active terminals in the field of view.

In one form, the method is performed by the receiver, and the receiver transmits changes to the system parameters to the plurality of terminals. Additionally or alternatively the method is performed as distributed optimization method in each of the plurality of terminals. In one form, the receiver transmits K the number of active terminals in the field of view to the terminals, or alternatively each terminal estimates K, the number of active terminals in the field of view by counting the number of acknowledgement messages transmitted during a frame. In one form, the transmission probability depends upon the number of failed transmission attempts.

According to an eighth aspect, there is provided a multi user receiver for use in a multiple access wireless communication system comprising a plurality of terminals, the multi user receiver comprising a receiver for simultaneously receiving m transmissions in each slot of a frame and a multiuser decoder for decoding the received transmissions, and the multi-access receiver is configured to perform the method of the sixth aspect.

According to a ninth aspect, there is provided a terminal for use in a multiple access wireless communication system comprising a plurality of terminals, the terminal comprising a transmitter and the multi user receiver comprising a receiver for simultaneously receive m transmissions in each slot of a frame and a multiuser decoder for decoding the received transmissions, and the terminal is configured to perform the method of the sixth aspect.

BRIEF DESCRIPTION OF DRAWINGS

A preferred embodiment of the present invention will be discussed with reference to the accompanying drawings wherein.

In the following description, like reference characters designate like or corresponding parts throughout the figures.

DESCRIPTION OF EMBODIMENTS

Figure 1:
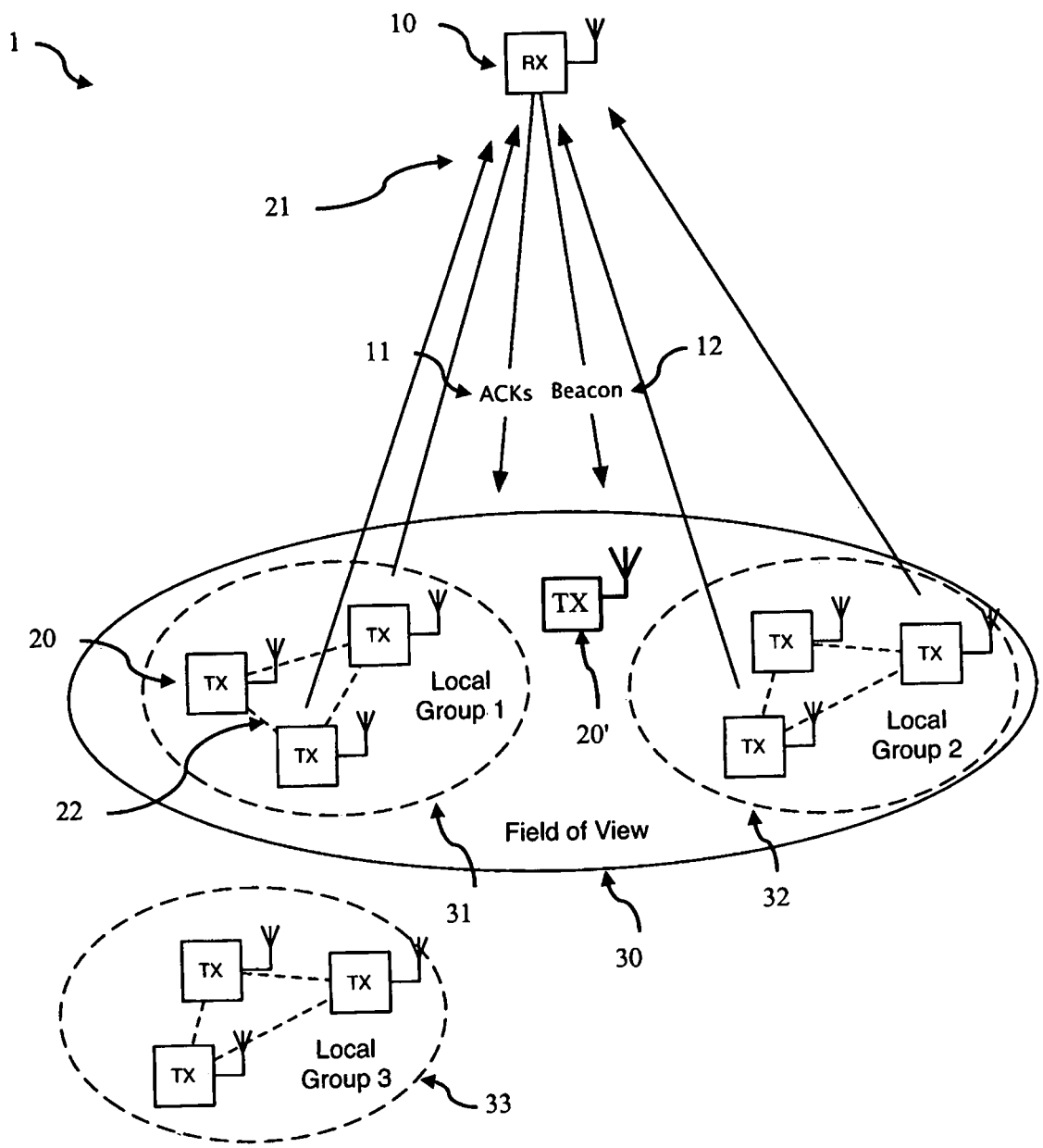
FIG. 1 is a schematic diagram of the system architecture according to an embodiment.

Embodiments of a multiuser communication system will now be described in which feedback from a multiuser receiver is used to signal to terminals whether or not their packet (or message) was successfully received. This feedback signal or acknowledgement message may be a positive acknowledgement (ACK) such as signal sent to terminals whose packets were successfully received, or a negative acknowledgement (NACK) which is sent to terminals whose packets were not successfully received. Such information may then be used by user terminals to set the activity state which controls whether or not, or when, a terminal can retransmit again. For example, if an active terminal transmits a message and receives an acknowledgement message (either an ACK, or it does not receive a NACK), the active terminals moves to an inactive state, and henceforth does not re-transmit while in the field of view. Other aspects will also be described, such as the use of a beacon or methods for system optimisation.

A shared physical communications medium may be partitioned into a number of channels. These channels may be time slots in a time division multiple access system, frequency slots in a frequency division multiple access system, subcarriers in an orthogonal frequency division multiple access system, or spreading sequences in a code division multiple access system. More generally, the slots may be hybrids of any of these, where a slot corresponds to some subset of the overall degrees of freedom of the system (including degrees of freedom resulting from the use of multiple transmit and or receive antennas). Regardless of the underlying method of dividing the medium into channels, we shall refer to these channels as "slots". We do not require that the slots be orthogonal, although in many instances slots are chosen to be orthogonal. We assume that time is divided into frames of length T seconds, and that there are n available slots (keeping in mind our very general definition of slot provided above) per frame. We assume that terminals are sufficiently synchronised such that they can agree on frame and slot boundaries (noting that slot boundaries may be defined in time, frequency or some other signalling dimension).

The multi-access receiver is equipped with a receiver for simultaneously receiving transmissions (ie messages or packets) in each slot of a frame and a multiuser decoder that is capable of successfully decoding some number of simultaneous transmissions by different terminals within the same slot. The multiuser receiver may be implemented using a soft decoder (eg such as those based upon the Viterbi or Trellis). That is, the receiver can successfully handle some number of collisions in a slot. In practice, the number of simultaneous transmissions within a slot that can be successfully decoded depends on a variety of systems parameters, including the received signal to noise ratio, the radio channel propagation characteristics between each terminal and the receiver, and the kind of multiuser decoder being used. For the sake of a simple explanation, we will assume that the multiuser receiver can successfully decode $m \geq 1$ simultaneous transmissions within a single slot. More detailed receiver characteristics can be easily taken into account if they are known. If a terminal transmits in a slot with m or fewer total occupants, we say it succeeds, otherwise we say it fails.

A schematic diagram of the communication system 1 architecture according to an embodiment is illustrated in FIG. 1. The communication system 1 comprises at a plurality of terminals 20, labelled TX and at least one multiuser receiver 10, labelled RX. The receiver has a field of view 30 which may contain some, but not typically all of the terminals in the system. Terminals, labelled TX wish to transmit messages or packets (the two terms will be used interchangeably) to the receiver RX, and optionally to each other. Nearby terminals may be able to receive each other's local transmissions 22. We refer to such a group of terminals as a local group. In FIG. 1, two local groups (31 and 32) are located within the field of view, and the third local group 33 is located outside of the field of view. The receiver may also communicate with individual terminals 20' which are not part of a local group (although they may be in communication range of terminals forming a local group).

Each frame, one or more terminals transmit messages 21 or data up to the receiver 21 and the receiver transmits (or broadcasts) one or more acknowledgement messages 11 to terminals. In one embodiment the acknowledgment messages are all positive acknowledgement (ACK) messages, and no negative acknowledgement (NACK) messages are sent. In this embodiment, terminals can thus always determine if a transmission was successfully received by the receiver, avoiding packet loss. Further bandwidth is used efficiently as not every transmission from a terminal has to be acknowledged. In another embodiment, all acknowledgment messages are negative acknowledgement (NACK)

messages, and no positive acknowledgement messages are sent. In this case terminals assume that a message was successfully received unless they receive a NACK message. Again this has the advantage of efficient use of bandwidth, as only transmissions not received are acknowledged. However, in some circumstances this can lead to packet loss if the receiver was unable to detect a transmission was made and so no NACK message is transmitted. In some embodiments both ACK and NACK messages are transmitted by the receiver. This creates additional overhead, as all messages are acknowledged (either positive or negative), but ensures no loss of packets, as if a terminal does not receive an ACK or a NACK, they can assume that their message was not successfully received and can attempt to retransmit (ie a lack of an ACK or a NACK implies a NACK). In the example embodiment shown in FIG. 1, the system 1 is configured to solely generate positive acknowledgement (ACK) messages 11. When the type of acknowledgment (ACK/NACK) does not matter, we will simply refer to these as acknowledgement messages. The acknowledgment messages may be transmitted on a dedicated logical channel for this purpose, or on another existing control channel or feedback channel. Acknowledgement messages may be transmitted prior to the start of transmissions in the next slot of the frame (eg more or less immediately such as at the end of the slot or between slot boundaries), or they may be transmitted at the end of the frame, or even as part of the next frame. In some embodiments, the acknowledgements are transmitted prior to the start of transmissions in the next frame, or even just prior to the start of the corresponding slot of the next frame, so that if a terminal was unsuccessful it can reuse the same (or corresponding slot) in the current (next) frame. Acknowledgement messages may be slot specific (ie the acknowledgment type or state applies to all transmissions in a slot), or acknowledgement messages may be terminal specific. Acknowledgement messages may include an acknowledgement type (eg one bit in which 1=ACK, 0=NACK), a slot identifier and/or a terminal identifier, so that the slot or terminal associated with an acknowledgement message can be determined by a terminal which receives the acknowledgement message. Acknowledgement messages may be transmitted in a designated slot of a frame (ie synchronised with the frame) or independently of the frame. Acknowledgement messages may be transmitted in the same channel as the transmissions, or acknowledgment messages may be sent on a different control channel (including a dedicated acknowledgement channel).

As discussed above, the multiuser receiver is capable of successfully decoding at most m simultaneous transmissions. That is, the receiver can successfully handle up to m collisions in a slot. The behaviour of the receiver when there were more than m transmissions in a slot (ie more than m terminals attempted to transmit a packet) may vary based on the configuration of the receiver, decoding algorithm, transmission or channel characteristics (eg noise levels) etc. In some cases the receiver may be able to successfully decode m of these transmissions, and be unable to decode the remaining transmissions. In other cases, the actual number of transmissions that the receivers can successfully decoded may be less than m, and in some other cases the receiver may completely fail to decode any of the transmissions in the slot (ie all transmissions fail). Regardless of the number of transmissions that can be successfully decoded, in some embodiments, the receiver may still be able to determine the identifiers of all terminals which transmitted, but be unable to successfully decode the remaining data portion of the message or packet for some of all the transmissions from the terminals. In such cases the receiver may still be able to send negative acknowledgement messages to those terminals whose transmissions could not be successfully decoded. In other embodiments, the receiver may be able to detect that other transmissions were made, but be unable to determine the identifiers of these transmissions. In such cases the receiver may transmit a slot based acknowledgment. For example, the receiver could send terminal specific positive acknowledges to the terminals whose transmissions were successfully decoded and a slot based negative acknowledgement so that all remaining terminals which transmitted in the slot are informed of the acknowledgement status (fail) of their transmissions (for clarity a terminal specific positive acknowledgement would trump or overrule the slot wide negative acknowledgement).

Figure 2:
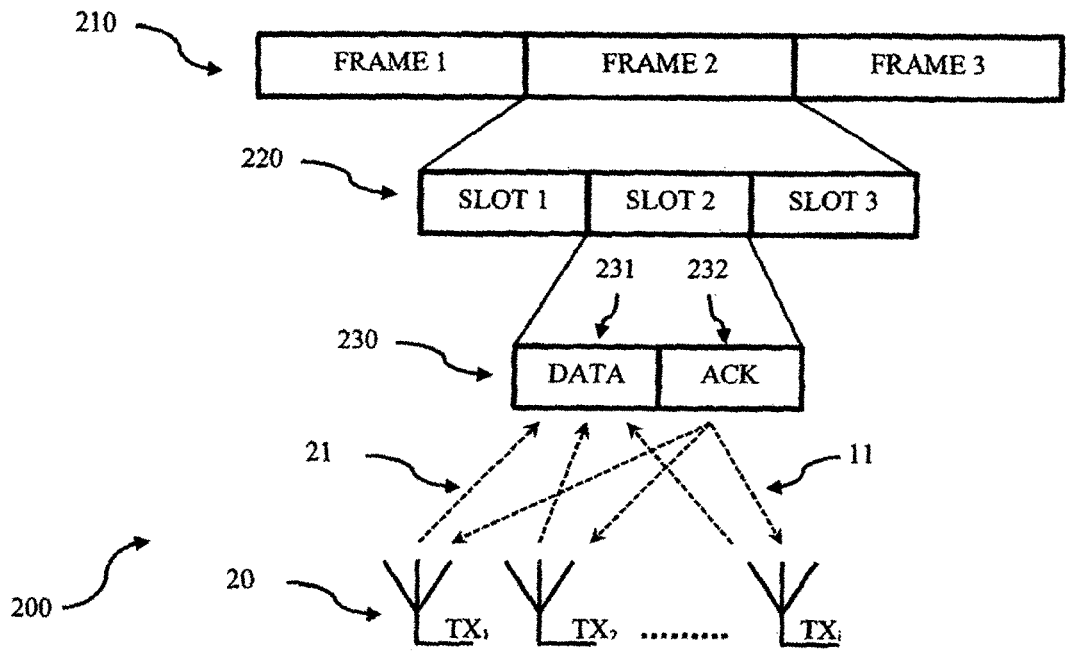
FIG. 2 is a first frame structure according to one embodiment.

FIG. 2 illustrates a first frame structure 200 according to one embodiment. In this embodiment, the frames 210 are each divided into n slots 220 (in the embodiment n=3). Each slot 230 comprises a data portion 231 during which multiple terminals (designated 1 . . . j) transmit a message (or data packet) 21 to the multi-access receiver, and an acknowledgement portion 232 during which the multi-access receiver transmits 11 acknowledgement messages to the terminals. Acknowledgments may be slot-specific or terminal-specific. Slot specific acknowledgments messages are a common acknowledgment message for all transmissions received from terminals that transmitted in that slot. This would apply, for example, when the multiuser receiver fails to successfully decode any terminal's packet in that slot. Terminal specific acknowledgements are acknowledgement messages addressed to each specific terminal. For example, the receiver may have successfully decoded only a subset of terminals in a particular slot in which case ACK messages will only be sent to those terminals, or alternatively NACK messages will only be sent to the terminals for which transmissions were not decoded in that slot (depending upon the system configuration). In the case where the acknowledgement messages are sent on another channel and are not synchronised with the data channel, there may be a delay of one or more frames before a terminal receives an acknowledgement message. That is, if a terminal transmits in a slot of a frame, then the terminal may not know of the success of a transmission before the corresponding slot in the next frame.

Figure 3:
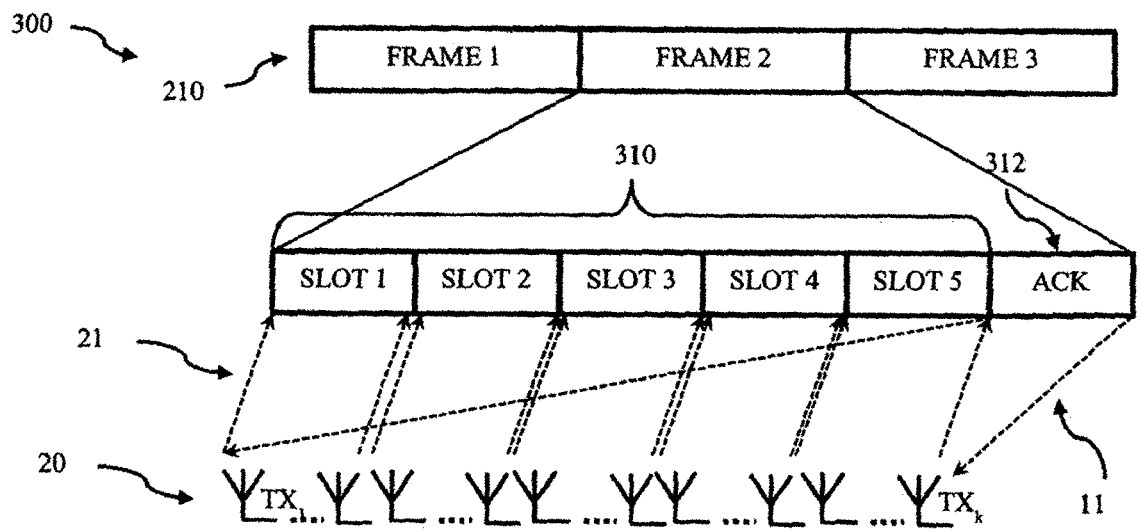
FIG. 3 is a second frame structure according to one embodiment.

FIG. 3 illustrates a second frame structure 300 according to another embodiment. As before each frame 210 is divided into n data slots 310 during which multiple terminals 20 (designated 1 . . . k) select one of the n slots and transmits a message 21 (or data packet) to the multi-access receiver. An additional acknowledgement slot 312 is provided at the end of the frame for broadcasting all the acknowledgments messages 11 to the k terminals 20 which transmitted during the frame. As discussed previously acknowledgment messages may be slot-specific or terminal-specific.

Figure 4:
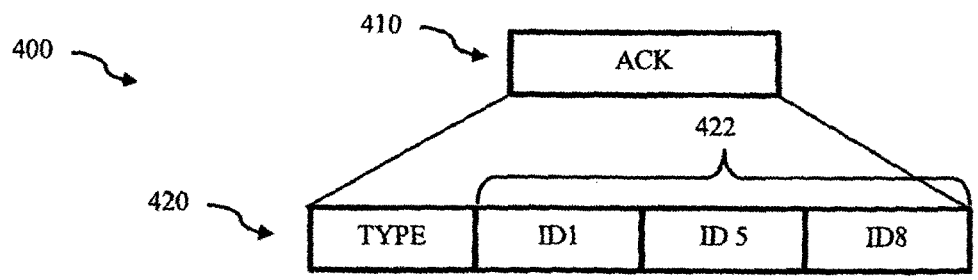
FIG. 4 is an acknowledgement slot structure according to one embodiment.

FIG. 4 is an acknowledgement slot structure 400 according to one embodiment. The acknowledgement slot 410 may comprise an acknowledgement type 420 (eg ACK or NACK), and/or one or more identifiers 422 (eg ID1, ID5, ID8). These may be a slot identifier, or a terminal specific identifier, or even a frame identifier, for example, if the acknowledgement messages are sent on another channel which is not synchronised with the data channel. If the system is configured to only transmit ACKs or only transmit NACKs then the acknowledgement type field may be omitted. Alternatively, the format of the slot could be a repeating set of fields comprising acknowledgement type followed by identifier or the set may be switched (ie identifier followed by acknowledgement type). Other fields may also be included (eg preamble, CRC, etc).

Figure 5A:
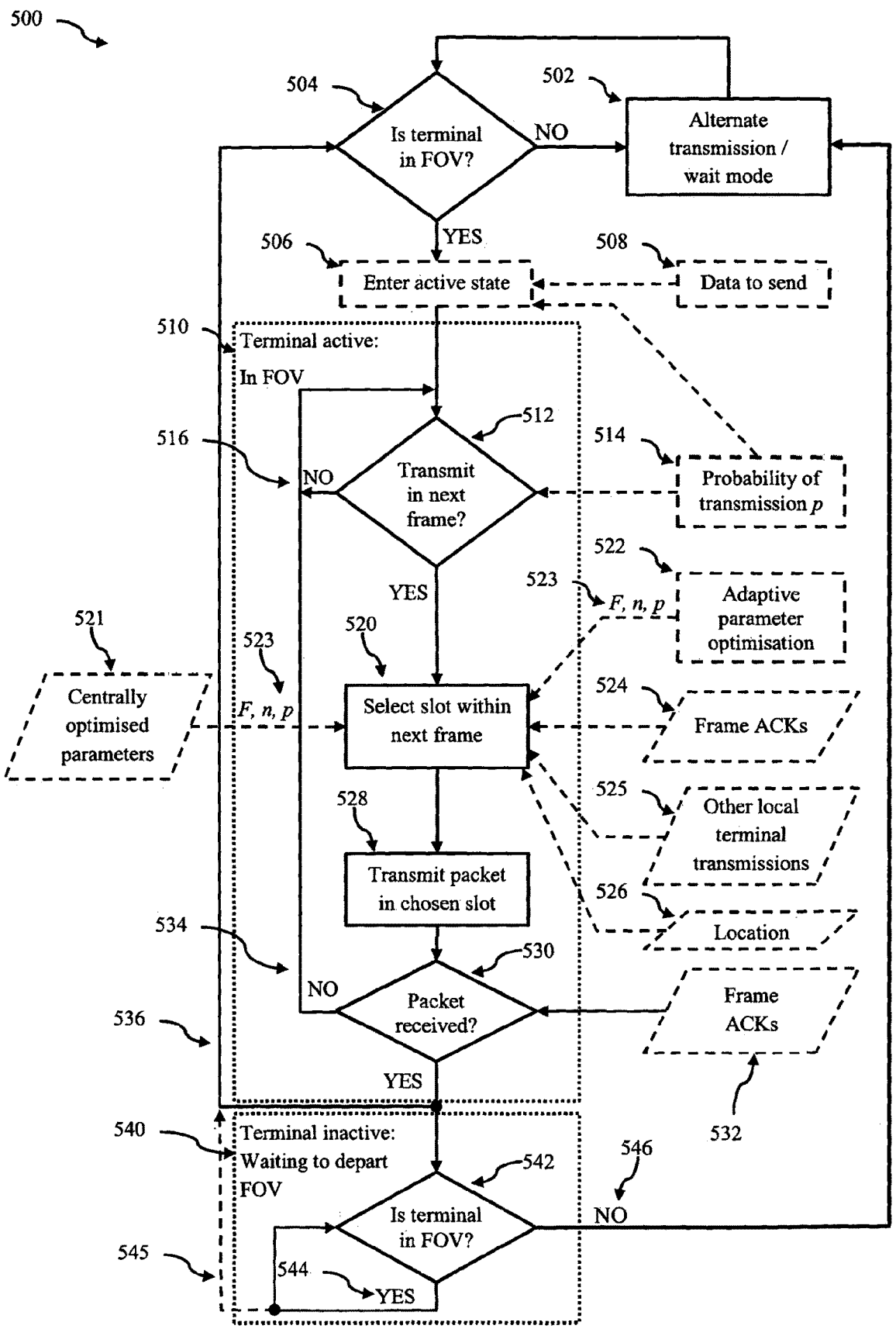
FIG. 5A is a flow chart of terminal operation according to an embodiment.

Each of the terminals has several main operation modes or states which will be referred to as the wait, active and inactive states. During the wait state, a terminal may communicate with other terminals in the local group and thus the wait state will also be referred to as the alternate transmission/wait state. Briefly terminals which are not in the field of view 3 of a multi-access receiver 10 are in the alternate transmission/wait state (referred to as wait state). Once they are in the field of view of a multi-access receiver and have a message (eg data packet) to transmit they enter the active state. Once they have successfully transmitted their message they enter an inactive state until they leave the field of view, after which they return to the wait state. In some embodiments the terminal may be allowed to re-enter the active state from the inactive state when the terminal has another message to transmit and other criteria are satisfied. After departing the field of view of a particular multi-access receiver a terminal may be allowed to become active when it re-enters the field of view at some later time (eg a subsequent satellite pass), or when the terminal enters the field of view of another receiver. A flow chart of method of operation of a terminal between these states according to an embodiment is illustrated in FIG. 5A, and further details of the operational modes, and transition between them is discussed below.

Figure 5B:
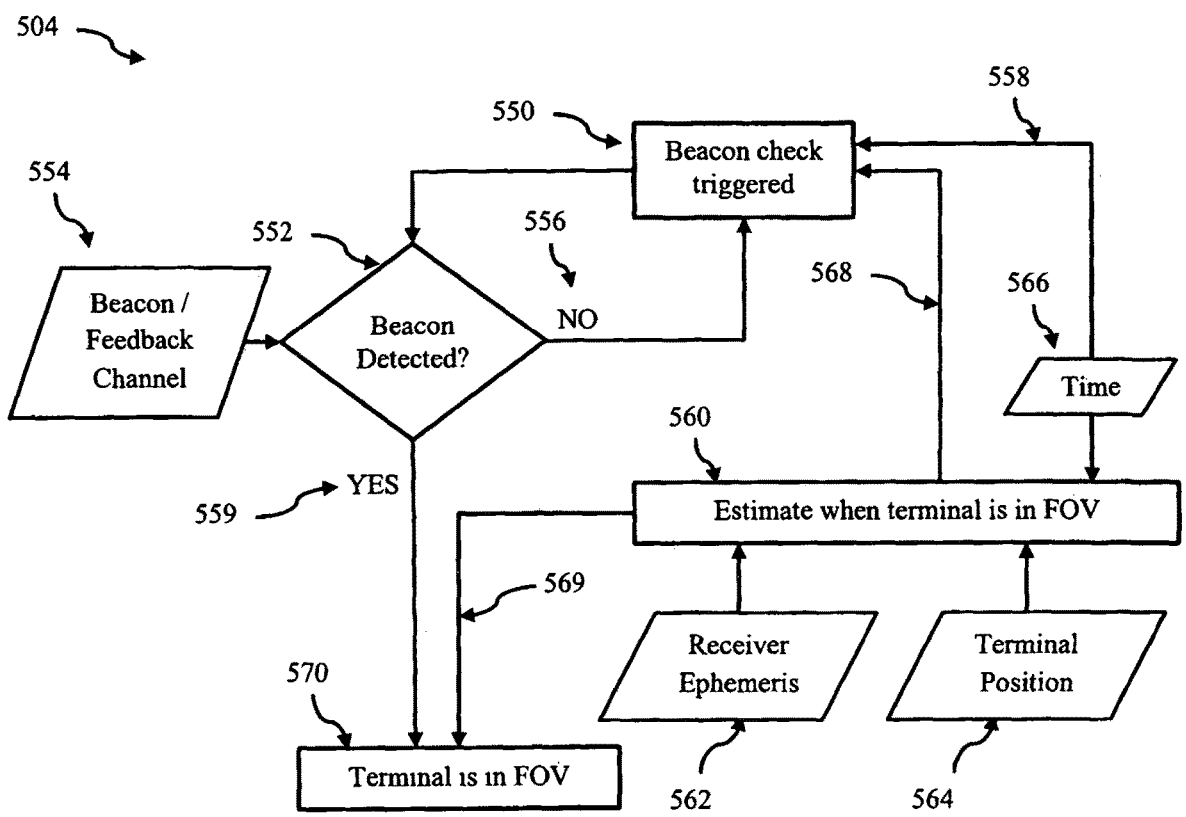
FIG. 5B is a flow chart of a method for determining if a terminal is in the field of view according to an embodiment.

For convenience, we will assume a terminal 20 is initially in a wait state 502. In this mode, a terminal 20 is out of the field of view 3 and is waiting for the multiuser receiver 10 to appear. Local groups of terminals (eg 31) in this mode may optionally communicate with each other, following some existing protocol. Thus, this mode may also be referred to as an alternate transmission/wait state to indicate that the terminal can operate (and transmit) according to another protocol when the terminal determines it is not in the field of view of the multiuser receiver. Thus, whilst in the wait state 502 the terminal 20 can attempt to determine if it is in the field of view (FOV) 504. If the terminal determines that it is in the FOV, it may enter an active state 506 and if it determines that it is not in the FOV the terminal again adopts the wait state 502. FIG. 5B is a flow chart of an embodiment of a method for determining if a terminal is in a field of view 504.

To assist terminals in determining if they are in the field of view 3, a multi-access receiver 10 may (ie optionally) transmit a beacon 12 signalling its presence to terminals within its field of view. This beacon 12 may be a signal specifically transmitted for this purpose, or it may be some other signal which is required to be transmitted anyway (ie observation of this signal by a terminal will indicate to the terminal it is in the FOV of the receiver 10). We shall refer to any such transmissions as a beacon signal 12, regardless of whether it is a specific beacon channel, or an existing transmission. In the wait mode, the terminal may periodically (ie from time to time) choose to monitor the beacon channel to determine if it has entered the field of view. This beacon check may be triggered periodically, or based on a timer, or scheduled time (eg a time trigger 558 may be provided by time source 566) or alternatively, the terminal may continuously monitor the beacon channel. Thus, as shown in FIG. 5B, a beacon check is triggered 550, and an attempt is made to detect the beacon 552, such as by monitoring a beacon or feedback channel 554. If no beacon is detected, the terminal stays in the wait mode, until the next beacon check is triggered 550. If a beacon is detected 559 then the terminal determines that it is in the FOV 570.

Additionally or alternatively, a terminal 20 may be pre-programmed, or otherwise provided (eg via a control channel) with the trajectory of the receiver(s) so that the terminal can estimate when the terminal is in the FOV 560. This approach is particularly suitable for multi-access receiver carried by a low earth orbit satellite or a long range unmanned aerial vehicle (UAV) which follow planned (ie known) flight paths or known trajectories, and for which ephemeris data 562 can be provided. A terminal can then use their own position 564 and/or the time of day 566 to determine whether it is in the field of view or the times during which it will be likely to be in the field of view (eg based on the ephemeris data) which can then be compared with the current time provided by time source 566. In one embodiment, the position is determined using a satellite positioning receiver, such as GPS receiver, or a signal received from another terminal (for example a nearby terminal with a GPS receiver), or another source, such as from a mobile network (eg a cell ID). Alternatively, if the terminal is fixed, the position may be pre-programmed during configuration. In one embodiment, the terminal has an on board clock, or determines the time via a GPS receiver or a broadcast time service, for example from a mobile network, and which may be used to synchronise a local clock. In one embodiment, the terminal can restrict beacon searches to times when it determines it is in the field of view, for example by using an estimate that the terminal is in the FOV as a trigger 568 for performing a beacon check 550, and in other embodiments (for example when no beacon is transmitted) the terminal makes its own determination 569 of whether it is likely to be in the field of view (or not), and changes operation state appropriately.

The terminal then enters an active state 506 (if not already in the active state) when it has data or a packet to send 508, and the terminal has determined that it is in the field of view of the receiver 504, such as by detecting a beacon signal. When in the active state 510 each terminal determines (each frame) whether or not to transmit a message (or packet) in the next frame 512. In some embodiments the terminals are pre-programmed with, or otherwise determine, a probability of transmitting p (or transmission probability) 514 and use this to determine whether or not to transmit in the next frame. Each frame the terminal can compare the transmission probability with a random number between 0 and 1 obtained from a random number generator. If the random number is less than or equal to the stored or predetermined transmission probability then the terminal decides to transmit. In other embodiments the terminal may be configured to always transmit in the next slot (ie p=1). If a terminal decides not to transmit 516, then in the next frame the terminal again repeats the test 512 to determine whether to transmit in the subsequent frame (ie the tests are independent).

The probability of transmitting p may be varied. This may be varied by the terminal or by the receiver (eg using a feedback channel) and may be varied from frame to frame (ie over time). As will be discussed below, the value may be obtained by optimisation methods which determine an optimal value based upon a certain criteria, and this may be performed by the terminal 522 in an adaptive parameter optimisation process, or it may be performed by the receiver or in a network operations centre as part of a central optimisation process. Different terminals may use different probabilities of transmitting. The probability make take into account various network and other factors or information, such as the system load, whether the previous attempt to transmit was unsuccessful, urgency or priority of information to be sent, time since data was generated, how long the terminal is expected to remain in the field of view, time until next satellite pass, etc. For example, the probability may be increased if the packet was not transmitted in one or more previous frame(s), or if the packet was unsuccessful transmitted (ie no ACK or a NACK received). Further, the various factors or information may be combined to arrive at a probability of transmitting. For example, if the system load is between in a moderate load range, and the time since the data was generated is a long period (perhaps compared to its importance), then a decision may be made to transmit. Weightings may be used to weight different factors based on their relative importance. Negative weights or factors can also be used to reduce the likelihood of transmitting. For example, if the terminal has already transmitted once during a satellite pass (eg enters test 512 via path 536), then a subsequent transmission may be discouraged to provide other terminals the opportunity to transmit. In this case, the probability of transmission may be set to zero following the transmission, and kept at zero for a minimum transmission delay time, or alternatively allowed to increase over time according to some rate or rate function (eg exponential with a decay parameter).

Alternatively, other methods, thresholds or criteria may be used to determine the decision of whether or not to transmit 512. For example, override criteria may be used to ensure a transmission in certain circumstances (high priority data), or to ensure no transmission in certain circumstances, such as high system load, or to ensure terminals only transmit once per pass of a satellite (ie once it has transmitted, the probability of transmitting is set to zero and kept at zero until the terminal enters the wait state). In a threshold based approach one or more system parameters or information are compared with specific thresholds, and the result of such comparisons used to make the determination of whether to transmit. For example, if the system load is above a certain threshold, then the terminal may decide not to transmit.

Once a terminal has determined to transmit in the next frame, the terminal must select a slot in the next (or a subsequent frame) frame 520. Slot selection can occur in a number of different ways. All terminals may use the same selection method, local groups of terminals may use same selection method, or terminals may each independently chose their selection method. In this latter case, the selection may be random, deterministic (eg depending upon time and/or location) or probabilistic, such as based on a Markov chain or similar process. Slot selection may be performed based upon adaptive parameter optimisation information 522, frame acknowledgement messages 524, other local terminal transmissions 525 or location information 526. Once the slot is selected, then the terminal proceeds to transmit the packet (or message) in the selected slot 528. The terminal then determines if the packet was received 530 for example by the use of frame acknowledgement messages 532. If a terminal then receives a positive acknowledgement, or does not receive a negative acknowledgement (depending upon the configuration of the system), the terminal then moves to an inactive state 540, and does not attempt to re-transmit the packet, or any further packets whilst the terminal remains in the field of view. If the transmission was unsuccessful 534 (ie a NACK or no ACK) the terminal can then again decide whether to transmit in the next frame 512 (optionally after having determined the terminal is still in the FOV). In an alternative embodiment, after successful transmission of a packet, instead of entering the inactive state, the terminal may instead attempt to transmit a further packet 536. In this case, the terminal again determines if it is in the FOV 504, and can optionally enter the active state (if not already in this state) 506 and then determine whether or not to transmit in the next frame 512. As discussed above, in the case where the terminal is attempting to transmit a further packet, the probability of transmission can be set to a low value and allowed to increase over time. In another embodiment, the terminal may enter the inactive state for a period of time after sending a packet (effectively setting the probability of transmission to zero), and after some time out or delay period, the terminal may attempt to send a further packet if it is still in the FOV (ie enter path 536 from block 540).

In one embodiment, slot selection is performed randomly, based on the outcome of a random number generator. In another embodiment, a geographic-based approach using location data 526 is used to select a slot such as that described in co-pending International Patent Application No PCT/AU2013/000895 titled "CHANNEL ALLOCATION IN A COMMUNICATION SYSTEM" filed on 14 Aug. 2013 by the University of South Australia, the entire contents of which is hereby included by reference. For example, geographic slot selection may use a slot plan database that comprises a plurality of geographic regions, and each geographic region is associated with a set of one or more slots. Allocation is performed by determining the geographic region that contains the geographic position of the terminal and selecting a slot from the set of one or more slots associated with the determined geographic region. Allocation may be performed using a graph-colouring algorithm. The use of geographic information allows spatial re-use, in which the same slots used in the field of view are re-used elsewhere in a non-overlapping field of view. Doppler information may be used to allow further reuse. Geographic based slot allocation may be used to obtain a set of slots for a local group of transmitters, and selection of a slot in the set of slots by a terminal is locally coordinated with the local group of terminals.

Slot selection may be performed based upon acknowledgment messages 524 (Frame ACKs). This may be acknowledgement messages relating to a previous transmission by the terminal, or previous transmissions by other terminals. In one embodiment, if a terminal determines that a previous transmission in a slot of another frame was unsuccessful (either a previous frame, or the current frame depending upon when the determination is made), then the terminal selects the same or the corresponding slot in the next frame. In another embodiment, the terminal selects a slot-based upon the acknowledgment messages sent in response to the previous or current frame, depending upon whether the slot selection is made during the transmission portion (eg middle) of a frame (use previous acknowledgements), or after the transmission portion of the current frame, but before the first transmission slot of the next frame (ie at or around the frame boundary). In this embodiment, the terminal uses all of the acknowledgements or negative acknowledgements sent in response to transmissions to determine the slot availability. This may be used in conjunction with knowledge of how other terminals are configured. For example, if the system is configured to transmit positive acknowledgements, and as terminals which successfully transmit enter an inactive state following transmission, the terminals may preferentially select slots for which positive acknowledgements were associated with, as these slots are likely to be available in the next frame (as the successful terminals will not be transmitting). Alternatively, if the system is configured to generate negative acknowledgements, and if terminals preferentially select the same (or corresponding) slot to use for re-transmission attempts in subsequent frames (eg SOTDMA and variants discussed below), then if a negative acknowledgement is observed for (or associated with) a particular slot a terminal may choose to not include that slot in consideration for its own transmission in the next frame (since there is a high probability that the terminals(s) which were unsuccessful in that slot will choose to use the same slot in the next frame).

More generally, the step of selecting a slot to transmit may comprise generating a set of available slots, and then selecting a slot from the set of available slots. Generating the set of available slots may comprise selecting all slots in a frame, and then excluding slots on the basis of some criteria or information. For example, in the above case, the step of selecting a slot to transmit in a first frame may comprise the steps of receiving one or more NACK messages sent in a previous frame before the first frame; determining a set of available slots in the first frame, by taking the set of all slots in the first frame and excluding each slot in the first frame for which a NACK message was associated with the corresponding slot in the previous frame; and selecting a slot from the set of available slots. In other cases the set of available slots may be based on acknowledgement messages (eg slots for which a NACK was received or no ACK transmitted) 524, geographic position of terminal 526, local coordination or knowledge of the behaviour of local terminals 525, or other information from the receiver (eg via a feedback channel), etc. This could be implemented in various ways. For example, an index could be assigned to each slot and a vector or array used to store the indexes of available slots. As slots are determined as available, they could be added or as slots are determined as not available, or to be avoided, they may be removed from the vector. Other efficient ways using binary logic may be used.

Additionally or alternatively, a probabilistic or statistically based approach may be taken to slot selection using one or more optimised parameters 523 such as from an adaptive parameter optimisation process 522. In this embodiment, each slot is assigned a weighting factor to alter or set the likelihood of a slot being selected, for example, when random selection from the set of available slots (which may be all slots) is used. Slots to be avoided can be given weights to reduce the likelihood of being selected, and slots to be selected can be given weights to increase the likelihood of being selected. This approach may be used to reduce the likelihood of multiple terminals all selecting the same available slot (for example based on slots for which positive acknowledgements were received). It is noted that weightings are typically relative and in one embodiment a weight of 1 is the reference with values more than 1 being a large weight (more likely) and values less than 1 being a low weight (less likely). In another embodiment, weights may be limited between zero and 1 with a weight of zero indicating no influence (unlikely), and a weight of 1 indicating full influence (likely). Other weighting schemes are possible.

As discussed, once a terminal has determined that it has successfully transmitted a message (or packet) the terminal enters the inactive mode 540. In the inactive mode the terminal is still within the field of view and the terminal's previously transmitted packet has been acknowledged by the receiver. In one embodiment the terminal remains silent until it is out of the field of view. Thus, the terminal can make a determination of whether or not the terminal is in the FOV 542. The terminal may perform the same process that was used at step 504, and illustrated in FIG. 5B, for example by tracking a beacon or by using ephemeris data. This procedure can be performed repeatedly (eg loop 544) on a continuous, periodic, or an adhoc basis until the terminal determines it is no longer in the FOV 546. Once the terminal has left the field of view, it returns to the alternate transmission/wait mode 502 and can re-enter the active mode the next time the terminal detects it is in the field of view of a receiver 504 (either the same multi-access receiver, or another multi-access receiver). This mode of operation allows each terminal to transmit one packet per time in field of view (eg satellite pass), and can be used to maximise the likelihood that all terminals in the field of view are given the opportunity to transmit data, rather than one or a few terminals dominating the available bandwidth. This approach can be used if the receiver is located on low earth orbit satellite or UAV in which the duration of a satellite pass is short, such as 10 minutes, but passes are relatively frequent. In such an operation mode, terminals can internally decide how to prioritise data to be sent. For example, some data may only be relevant for a certain period of time, and thus may be discarded if it is not sent within a defined time period of collection. Similarly, a time based weighting factor or function may be applied. For example, a Gaussian function could be used in which the weight (importance) of the data grows with time to some maximum, after which it decreases. The peak could be located around the middle to end of the data lifetime. A skewed weighting function could be used so that the importance grows slowly with time, but falls rapidly once the expiration time is reached.

In another embodiment, when inactive terminals have a new packet to send, they may be allowed to become active once (ie whilst still in the field of view) depending upon a number of criteria. For example, the terminal may be forced to enter the inactive period for a minimum transmission delay time. After his delay time, the terminal may follow path 545, determine if it is still in the FOV 542 or 504 and if so enter the active state 506, etc. In another embodiment, the probability of transmission may be controlled to reduce the likelihood of a terminal transmitting twice within the same field of view. For example, following successful transmission the probability of transmission may be set to zero and then allowed to increase over time according to some rate or rate function (eg exponential with a decay parameter). The length of the period of time the probability of transmission is zero may be set to a fraction of the expected transit time (eg, ¼, ½, etc). Alternatively, the terminal could monitor the system load, or the rate of change of system load. For example, in one embodiment, the receiver broadcasts a signal which indicates the current system load (ie the number of terminals K in the field of view). Alternatively the terminals can also estimate the system load K implicitly, via counting the number of acknowledgments (or negative acknowledgements) each frame 524. A terminal may be allowed to re-enter the active mode from the inactive mode if the system load falls below a threshold value, or if the rate at which the system load is decreasing indicates available system capacity. In another example, if there are multiple multi-access receivers which may have over lapping fields of view, then the terminal may be allowed to enter the active mode and transmit to the second multi-access receiver if it enters the field of view of the second multi-access receiver. In some embodiments, rather than enter an inactive mode, the terminals may set the probability of transmission to zero for a period of time, or the inactive mode may be defined by a probability of transmission of zero.

As will be presented below, the use of acknowledgement messages in such communication systems may be used to improve the system capacity (and thus efficiency) compared to open loop communication systems. Further, by forcing terminals to enter an inactive mode following a transmission, and/or only allowing a terminal to transmit once per time in the field of view (eg once per satellite pass), the system can be designed to increase throughput and/or ensure the likelihood that all sensors are given an opportunity to transmit data. This can be used to ensure a desired quality of service criteria is met or maintained.

Further, as will be described below, acknowledgement messages may be optionally compressed, for example using hashing of a terminal identification number. The size of the hashing may be chosen to ensure a sufficiently small probability of hash collisions within the population of terminals expected within the field of view. This has the effect of reducing the resources required for transmission of acknowledgments, and is useful for large terminal populations.

The number of slots per frame n, the number of frames F that the terminal is in the field of view for, and the probability of transmitting p may be predetermined or pre-programmed, communicated from the multi-access receiver to the terminals 521, or adaptively optimised based by the terminal 522 on observation of previous acknowledgements or other information. Optimisation of these network parameters is described in more detail below and may be used to meet various quality of service requirements such as a decrease in the failure probability, or increase overall system efficiency, such as by decreasing the number of slots required to support a given terminal population.

In some embodiments, the multi-access receiver may be able to determine the likelihood of being able to successfully decode the terminal's packets in a particular slot, without actually decoding them. In this case the acknowledgment message sent by the receiver can be a predictive acknowledgement based upon an estimate of the likelihood of successfully decoding the associated transmission This can be accomplished, for example, by performing only the initial acquisition component of the received message which determines initial time, frequency, and phase offset estimates. The receiver can compare these estimates to a stored receiver operating characteristic table of decoding likelihood. This table may be predetermined ahead of time, eg using analysis or computer simulations, and pre-programmed in the receiver. Alternatively, it may also be updated in an online fashion, depending on the outcome of previous decoding attempts.

Another way that this can be accomplished is by early examination of internal parameters of the multiuser decoder as it commences decoding. For example, in an iterative decoder, the change of log-likelihood values (or residual noise/interference variance) over iteration may indicate the eventual 2 likelihood of successful decoding. A threshold (fixed or dynamic) may be set so that if the receiver is confident that is very likely going to be able to successfully decode a received transmission at a later time, then the receiver may send an acknowledgement (eg in the current frame) and delay decoding until after sending the acknowledgment message.

This is advantageous in situations where it may take a long time to completely decode the signals, or where it is desirable to operate the receiver in a low-power/low-speed mode due to energy constraints. Another motivation is in a satellite system where the receiver may wish to store signals for later decoding when it has fewer terminals in its field of view (for reasons of load balancing or spacecraft bus duty cycles).

In order to send an acknowledgment to L successful terminals (or negative acknowledgements to L unsuccessful terminals), one might expect that the receiver has to send $$L \log_2(K_{total}) \text{bits} \tag{1}$$

of information, where $K_{total}$ is the total number of possible terminals in the system. In this naïve approach, the receiver uses $\log_2 K_{total}$ bits to form the binary expansion of a unique identification number associated with the terminal in question, and there are L terminals that must be informed. In some applications, $K_{total}$ may be significantly (orders of magnitude) larger than K, the number of terminals in the field of view at any one time.

Thus, in some embodiments, various compression methods may be used to compress broadcast acknowledgements by reducing the number of bits of feedback required to send the required acknowledgements or negative acknowledgments.

In one embodiment, slot-based acknowledgments are used. For example, in some multiuser decoding algorithms, it is common that the decoder can either successfully decode all terminals in a slot, or none of the terminals in a slot. Thus, instead of sending an acknowledgement that is addressed to an individual terminal, the receiver can instead address the acknowledgment to all terminals within a particular slot. That is, an acknowledgement message is a slot acknowledgement message which can be used for acknowledging all transmissions received in a slot of a frame. The slot acknowledgement message may comprise a common acknowledgement message for all transmissions received in a slot of the frame, and may optionally include a slot identifier (or slot index). In comparison to $\log_2 K_{total}$ a slot acknowledgement can be achieved with $$\min\left\{n, L\log_2 n, \log_2 n + \log_2 \binom{n}{L}\right\} \text{ bits.} \tag{2}$$

The minimisation arises from the fact that we can either use (a) a one-bit ACK/NACK for each of the n slots, or (b) send a $\log_2 n$ bit identifier for each of the L slots, or (c) identify how many slots L are acknowledged (or negatively acknowledged), which takes at most $\log_2 n$ bits, followed by an identification of the particular subset of L slots. The latter takes at most $$\log_2 \binom{n}{L} \text{ bits.}$$

bits. In many applications, (2) may be much smaller than $\log_2 K_{total}$.

In another embodiment, hashing of a terminal identification number (or terminal identifier) may be used to compress the size of acknowledgement messages. The size of the hashing may be chosen to ensure a sufficiently small probability of hash collisions within the population of terminals expected within the field of view. This has the effect of reducing the resources required for transmission of acknowledgments, and is useful for large terminal populations. Hashing of terminal identifiers provides most benefit when terminal specific acknowledgement messages are used (ie the acknowledgement message includes a terminal identifier). It is however noted that hashing may also be used for compressing slot identifiers. However, typically there will be many orders of magnitude more terminals than slots (eg 1,000,000 or more terminals in a system, whilst there may be only a 1000 or so slots per frame), and thus the gain from compressing slot identifiers is not as great as the gain from compressing terminal identifiers.

Let the $K_{total}$ terminals be indexed by integers i=0, 1, 2, ..., $K_{total}$-1. Suppose that there are K terminals in the field of view, and that acknowledgments (or negative acknowledgments) must be sent to L of these terminals. Instead of individually identifying each of these L terminals (or L slots as discussed above), we can send a hashing function h(•) with the property that h(i)=0 for any index i belonging to a terminal (or slot) that requires acknowledgment. That is a hashing function h which generates a binary value output (1 or 0; true or false). The hashing function is generated by the receiver in such a way that when a terminal identifier in a set of terminals to be acknowledged is input, the hashing function outputs a first binary value (eg true or false), and if an input terminal identifier is not in the set of terminals to be acknowledged the hashing function generates a complementary binary value output (false or true). One possible example of a hashing function is a binary matrix M with $\log_2 K_{total}$ columns and l<<L rows such that the matrix-vector modulo-2 multiplication $$Mb(i)=0 \qquad (3)$$

where b(i) is a length $\log_2 K_{total}$ binary vector containing the binary expansion of the integer i, and the right hand side is a length l all zero vector. Such a matrix M may be found as a basis of the null space of the span of the L binary vectors corresponding to the L terminals (or slots) of interest. Other hashing and identification methods are possible such as the approach described in R. Ahlswede and G. Dueck, "Identification via channels", *IEEE Trans. Inform. Theory*, vol. 35, no. 1, pp 15-29, 1989. Once the hashing function is generated it can be transmitted as the part of the acknowledgement message. Terminals which receive the hashing function can then enter their terminal identifier to the hashing function, and determine if they are acknowledged based upon the binary value output.

In some applications, the terminals not only wish to communicate to the multiuser receiver, but they also may wish to communicate with other nearby terminals. For example, the terminals may be associated with environmental sensors, which form local wireless sensor networks for the purposes of exchanging information and possible improving the sensing accuracy of the overall network. Exchange of data between terminals may also make it possible to reduce the amount of data required to be sent back to the sensor fusion hub. There are many existing protocols for controlling the operation and communications of such sensor networks.

In some embodiments, the multiuser receiver may correspond to a mobile or intermittently available data collector, which wishes to collect the measurements from the sensor network. For example, it may be mounted on a low earth orbit satellite, or an aircraft or UAV. In some embodiments, the terminals may have a pre-existing protocol for communicating with each other. Local groups of terminals may be able to coordinate their transmissions (either in as distributed fashion, or by some central controlling node) with the multiuser receiver. However, as illustrated in FIG. 1, the field of view may include many such disconnected local groups, each of which is locally coordinating their transmissions, but in which there is no global coordination.

One option is to for the terminals to continue to use their pre-existing protocol for transmission to the multiuser receiver when the terminals are in the field of view. However, the pre-existing protocol may not have been designed to support the increased number of terminals that may be visible within the field of view. Thus, to improve the overall system performance (eg increase capacity or decrease failure probability), terminals may optionally enter a different mode of operation once it is detected that they are in the field of view of the multiuser receiver. In this mode, the terminals may follow the slot-based transmission scheme described above. Once a terminal leaves the field of view, it may return to its other mode of operation.

One method for local coordination of groups of terminals is known as self-organising time division multiple access (SOTDMA). This method is used in the Automatic Identification of Ships maritime system. In SOTDMA, time is divided into frames, and each frame consists of a number of time slots (ie a special case of the frame/slot structure described above). Upon entering a SOTDMA group, terminals listen for one frame to determine which slots are already claimed by other terminals. It chooses its own slot from the pool of unused slots. It then uses this slot for its own transmission in each subsequent frame. This facilitates the avoidance of slot collisions for members of a SOTDMA group.

However, as illustrated in FIG. 1, when the receiver is a located on a platform such as a low earth orbit (LEO), there may be multiple local SOTDMA groups within the field of view of the receiver. However, as each SOTDMA group acts independently (ie communications are not coordinated between groups) and this may result in undesirable slot collisions at the multiuser receiver mounted on the satellite. To avoid this problem and decrease the failure rate at the multiuser receiver, terminals can use the acknowledgements broadcast by the satellite to additionally inform their choice of slot within a frame. Under SOTDMA a negative acknowledgement for a particular slot means that the corresponding terminal(s) will re-transmit in that same slot in the next frame. Terminals can thus use the received negative acknowledgements to extend the SOTDMA principle to the entire field of view. Terminals can monitor all acknowledgements transmitted in a slot or a frame to obtain information beyond their SOTDMA group and this information can then be exploited by the terminal when selecting a slot. In this embodiment, in which the system is configured to generate NACKs, listening terminals can choose to avoid (ie not select) slots which were negatively acknowledged. Once a terminal leaves the field of view, it may return to standard SOTDMA operation within its local group.

In the context of a system in which terminals that successfully transmit a message enter an inactive state, this principle can be more generally extended to the use of both positive and negative acknowledgements. Terminals can monitor all acknowledgements transmitted in a slot or a frame to obtain information about slot use throughout the field of view, and this information can then be exploited by the terminal when selecting a slot. In particular, a positive acknowledgement for a particular slot means that the transmission from the corresponding terminal(s) was successfully decoded, and the terminal will not transmit in the next frame, and thus the slot used is available. Thus, in embodiments in which the system is configured to generate ACKs, listening terminals can be configured to preferentially select slots which were positively acknowledged.

In wireless communication networks there are typically many configurable or implementation specific network parameters. These include the probability of an active terminal deciding to transmit in a frame p (probability of transmitting), the number of slots per frame n, the number of simultaneous transmissions that a multiuser can successfully decode in a single slot m, and the probability of failure of a terminal to successfully transmit a message whilst in a field of view of the multiple access receiver ϵ, the number of frames F that a terminal is in the field of view for, etc, the total number of terminals in the system, $K_{total}$. Further, there are often a range of quality of service, capacity and system efficiency requirements that need to be met or maintained, and thus it is desirable to optimally choose network parameters to provide a cost effective system. Further, as networks are dynamic, with the number of terminals and receivers varying over time, combined with the mobile nature of the system components, it is desirable to periodically or even continuously update values of network parameters to ensure the ongoing efficient operation of the system. In the next sections, the theoretical relationship between network parameters for embodiments of the system described herein are developed and used to illustrate the advantages of the system over open loop systems, and to develop methods for optimising network parameters such as (p, n, m, ϵ).

The system uses a shared physical communications medium may be partitioned into a number of slots (time, frequency, spreading sequences, combinations etc). Further, the system comprises a multiuser receiver, which can successfully decode m≥1 simultaneous transmissions within a single slot.

Suppose that we have k transmitting terminals in the field of view and n available slots. Under the random access approach, each transmitting terminal selects a slot uniformly at random. Then the probability that a particular slot is chosen by m terminals is $$P_m = \binom{k}{m}\left(\frac{1}{n}\right)^m \left(\frac{n-1}{n}\right)^{k-m}. \quad (4)$$

This is known to be well approximated by $$P_m \approx \frac{1}{m!}e^{-\lambda}\lambda^m @ P_m(\lambda), \text{ where } \lambda = \frac{k}{n}. \quad (5)$$

This is the well-known Poisson approximation to the binomial distribution. Using this approximation, the probability that a slot has more than m terminals is $$1 - Q(m+1, \lambda), \quad (6)$$

where $$Q(a, z) = \frac{\Gamma(a, z)}{\Gamma(a)} = \frac{1}{(a-1)!}\int_z^\infty t^{a-1}e^{-t}dt \quad (7)$$

is the regularised incomplete gamma function.

Retaining our Poisson approximation, let $P_{succ}$ be the probability that a terminal is in a slot occupied by m or fewer terminals. Then it can be verified that $$P_{succ} @ \sum_{i=1}^{m} iP_i = Q(m, \lambda). \quad (8)$$

There are $k_{succ}=kP_{succ}$ terminals that are in slots occupied by m or less terminals. We define $P_{fail}=1-P_{succ}$ to be the probability that a terminal is in a slot with more than m occupants.

We assume that time is divided into frames of length T seconds, and that there are n available slots (keeping in mind our very general definition of slot provided-above) per frame. We assume that terminals are sufficiently synchronised such that they can agree on frame and slot boundaries (noting that slot boundaries may be defined in time, frequency or some other signalling dimension).

Let there be K active terminals in the field of view of a multiuser receiver which has capability to decode m or fewer terminals in a single slot. Each frame let each terminal independently choose to transmit with probability p, i.e.

$$k \approx pK \quad (9)$$

(in fact E{k}=pK, and the approximation is tight for large K). Note that p=1 is valid. In that case, a terminal transmits every frame.

In an open-loop system, each transmitting terminal does not know if its transmission was successful, and remains active, repeating its transmission, for each of the F frames for which it is in the field of view. This results in inefficient use of the available physical medium, and can significantly increase the number of packets which are not received due to multiuser receiver failures. Furthermore, the terminals may not even know when they are in the field of view of a receiver, and may unnecessarily transmit signals which cannot be received at all by any receiver. This reduces the energy efficiency of the terminals, which may be important when terminals are battery powered. In embodiments of the system described herein, these problems are addressed by using feedback from the multiuser receiver to signal to terminals whether or not their packet was successfully received (ie ACKs or NACKs) and the transmission of a beacon to signal a multiuser receivers presence to terminals within its field of view. If a terminal receives an acknowledgement (or does not receive a negative acknowledgement), it moves to an inactive state, and is either configured to not re-transmit whilst in the field of view, or is configured to reduce the likelihood of re-transmitting whilst in the field of view. This promotes a system design approach of attempting to ensure all terminals are given an opportunity to transmit at least one packet each time they are in the field of view (eg each satellite pass). That is a minimum level of service to all terminals is favoured over guaranteeing throughput of specific terminals.

Let $K_f$, f=0, 1, . . . , F−1 be the number of terminals which have failed f times. We say that a terminal is in state f if it has failed f times. Thus there are $K_f$ terminals in state f. At the commencement of each frame, $K_0$ new terminals enter the field of view. Then $K_0/T$ [terminals/sec] can be regarded as the "arrival rate" of terminals into the field of view. Terminals could arrive into (and later depart) the field of view for several reasons. For example, the terminals may be mobile. Alternatively, the terminals may only be intermittently activated or switched on. In another example, the field of view itself may move (e.g. the receiver is a low earth orbit satellite, or aircraft). There are $$K = \sum_{f=0}^{F-1} K_f \quad (10)$$

terminals in the field of view (as discussed above, each terminal has at most F attempts before it moves out of the field of view).

Each frame, a terminal in state f=0, 1, ..., F−1 can do one of three things. The terminal can transmit successfully, in which case it then moves to a success state and becomes inactive. This happens with probability $pP_{succ}$. Alternatively, the terminal can transmit unsuccessfully, in which case it moves to state f+1, or a fail state if f=F−1. This happens with probability $p(1-P_{succ})=pP_{fail}$. Alternatively, if the terminal does not transmit, in which case it moves to state f+1 or fail state if f=F−1. This happens with probability $(1-p)$. So a terminal in state f=0, 1, ..., F−2 moves to state f+1 with probability $$q @ 1 - pP_{succ} = (1-p) + pP_{fail}. \quad (11)$$

Figure 6:
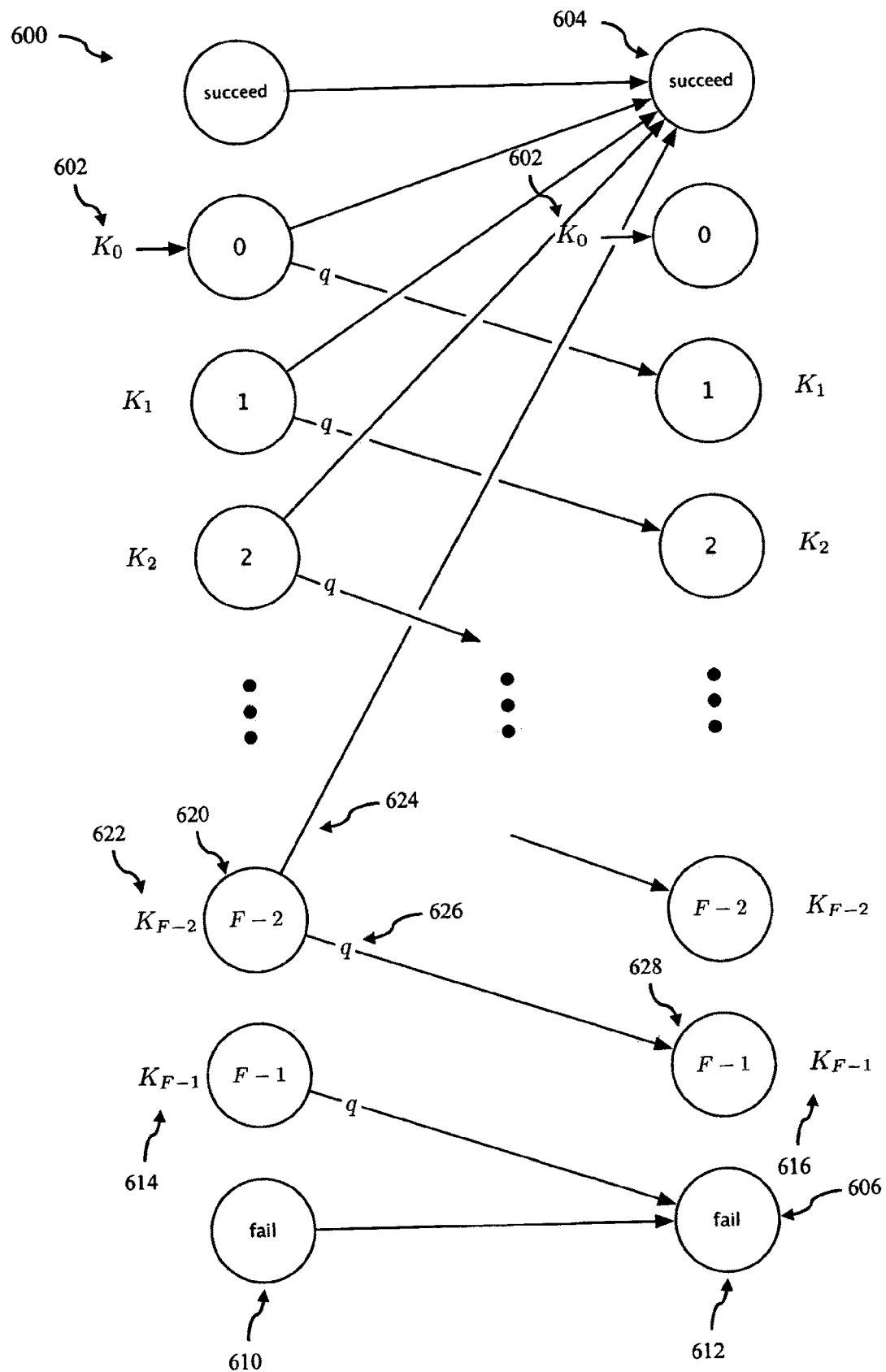
FIG. 6 is a plot of the number of terminals in each state at equilibrium.

An open loop system with no acknowledgements is modelled by q=1 (since every terminal stays active while it is in the field of view). With the above definition of $P_{succ}$, we note that q is a function of m and $\lambda=k/n=pK/n$. FIG. 6 illustrates 600 the number of terminals in each state at equilibrium. Nodes 610 represent a set of first states that terminals are in, and nodes 610 represent a second set of states that terminals can move too. The number of terminals $K_f$ in each state f are shown next to each node 614 616 along with the number of new terminals entering the field of view $K_0$. Taking an example state 620 corresponding to F−2, there are terminals, and following a transmission, a terminal either transitions 624 to the succeed state 602 it is was successful or transitions 628 the next state F−1 if it was unsuccessful with probability q. At steady state equilibrium, $K_f$ remains the same from frame to frame (hence we omit a frame index from all these quantities). Then $$K_f = qK_{f-1} = q^f K_0 \quad (12)$$

and $$K = K_0 \sum_{f=0}^{F-1} q^f \quad (13)$$

$$= \begin{cases} K_0 \frac{1-q^F}{1-q} & 0 \leq q < 1 \\ FK_0 & q = 1, \end{cases}$$

which for q<1, implies $$(1-q)K = (1-q^F)K_0. \quad (14)$$

Note that 1−q is the proportion of terminals that succeed in a given frame. Similarly, $1-q^F$ is the proportion of terminals that succeed at some point while they are in the field of view. Noting that k=pK, and $\lambda=k/n$, we can re-write (14) as $$(1-q)\lambda n = (1-q^F)pK_0, \text{ where}$$

$$q = 1 - pQ(m, \lambda). \quad (15)$$

Figure 7:
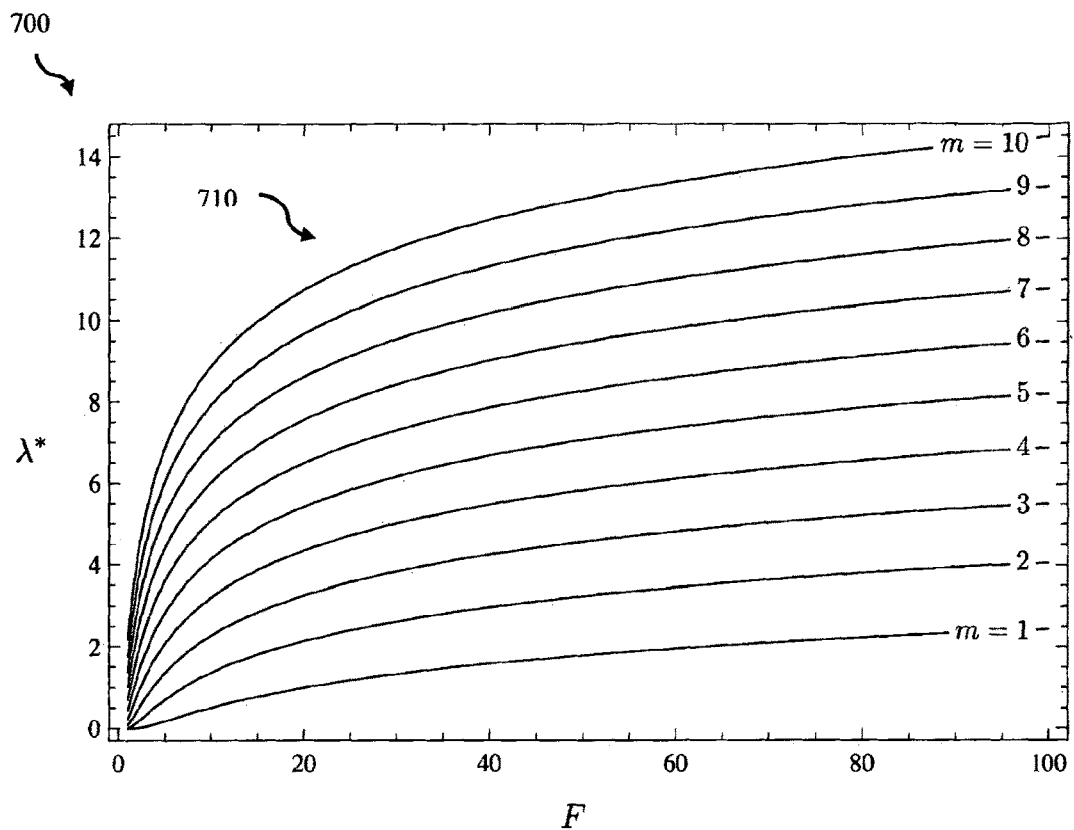
FIG. 7 is a plot of the optimal values of $\lambda^*(1,m,10^{-4})$ with $p=1$, $\varepsilon=10^{-4}$ and $m=1, 2, \ldots, 10$.

So we have an equation which links m, n, p, $\lambda$ and $K_0$. To emphasise the dependence of q on p, m,$\lambda$, we will write q(p, m,$\lambda$). There are several ways this expression can be used to obtain useful numerical results. For example, fixing p, m and the failure probability ε, we can use standard numerical software such as Mathematica to solve (15) to obtain the optimal $\lambda^*$ as $$\lambda^* = Q^{-1}(m, 1 - \varepsilon^{1/F}) \quad (16)$$

where $Q^{-1}$ is the inverse regularised gamma function (which may be numerically computed using software such as Mathematica). FIG. 7 is a plot 700 of curves 710 of the optimal values of $\lambda$ versus F computed for p=1, $\varepsilon=10^{-4}$ and m=1, 2, ..., 10 according to an embodiment.

Where we need to emphasise its dependence on p, m, ε, we will write $\lambda^*(p,m,\varepsilon)$. Further supposing that n is fixed, we have $$K_0 = \frac{1 - \varepsilon^{1/F}}{1 - \varepsilon} \lambda^* n \quad (17)$$

as the maximum number of new terminals arriving into the field of view each frame. Note that with this fixed probability of failure, a system with no acknowledgements (or negative acknowledgements) can support $\lambda^*$n users. Hence, the relative improvement obtained through the use of acknowledgements is $$g(\varepsilon, F) @ F \frac{1 - \varepsilon^{1/F}}{1 - \varepsilon}. \quad (18)$$

Figure 8:
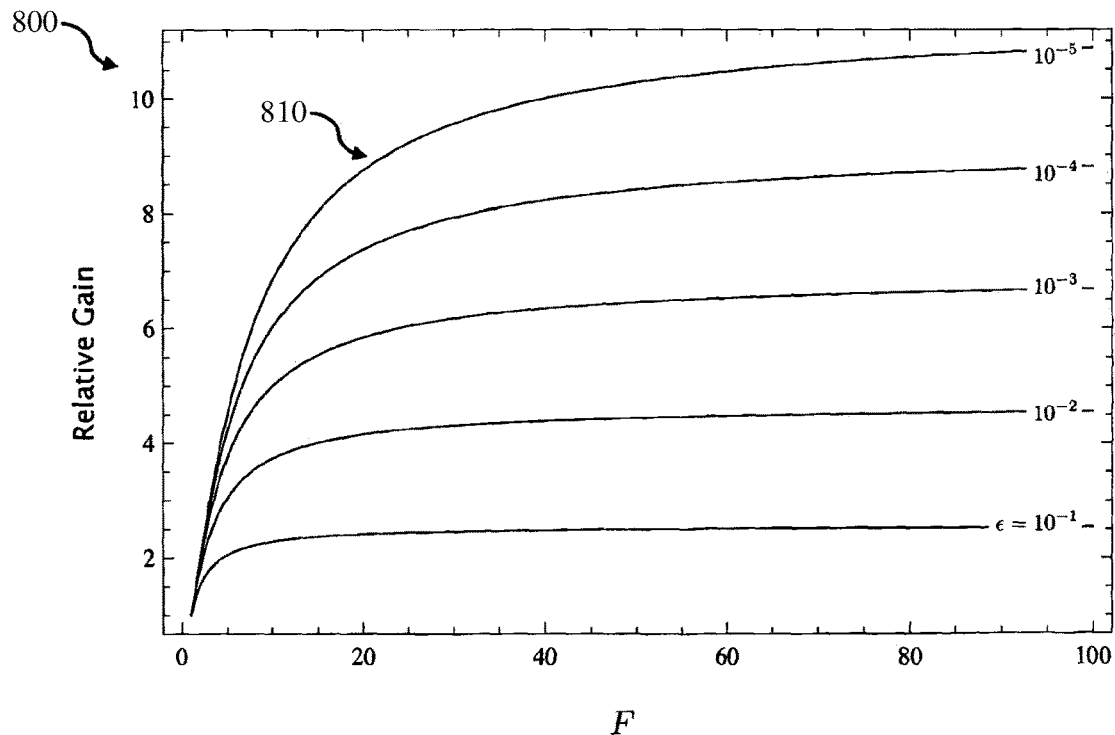
FIG. 8 is a plot of the relative gain through the use of acknowledgements.

This is plotted below in FIG. 8 which is a plot 800 showing curves 810 of the relative gain as a function of F for failure probability ε, ranging from $10^{-1}$ to $10^{-5}$ according to an embodiment. As F increases, we have the following asymptotic relative gain $$\lim_{F \to \infty} g(\varepsilon, F) = \frac{\ln \varepsilon}{1 - \varepsilon}. \quad (19)$$

For $\varepsilon=10^{-e}$, this asymptote is well approximated by eln10.

FIG. 6 shows numerical results for an example scenario involving communication with a low earth orbit satellite. In the example, the satellite pass duration (ie the length of time for which the satellite is visible above a certain elevation from a fixed point on the earth) is $T_{pass}$=600 [second]. The number of frames in a pass $F=T_{pass}/T$ is computed from the pass duration $T_{pass}$ and the re-transmit interval T [second]. The number of available slots in a frame is n=T/0.025 which models a single carrier system with time slots of duration 25 millisecond. Equivalently, this models time slots of duration 250 millisecond, with 10 frequency channels.

Figure 9:
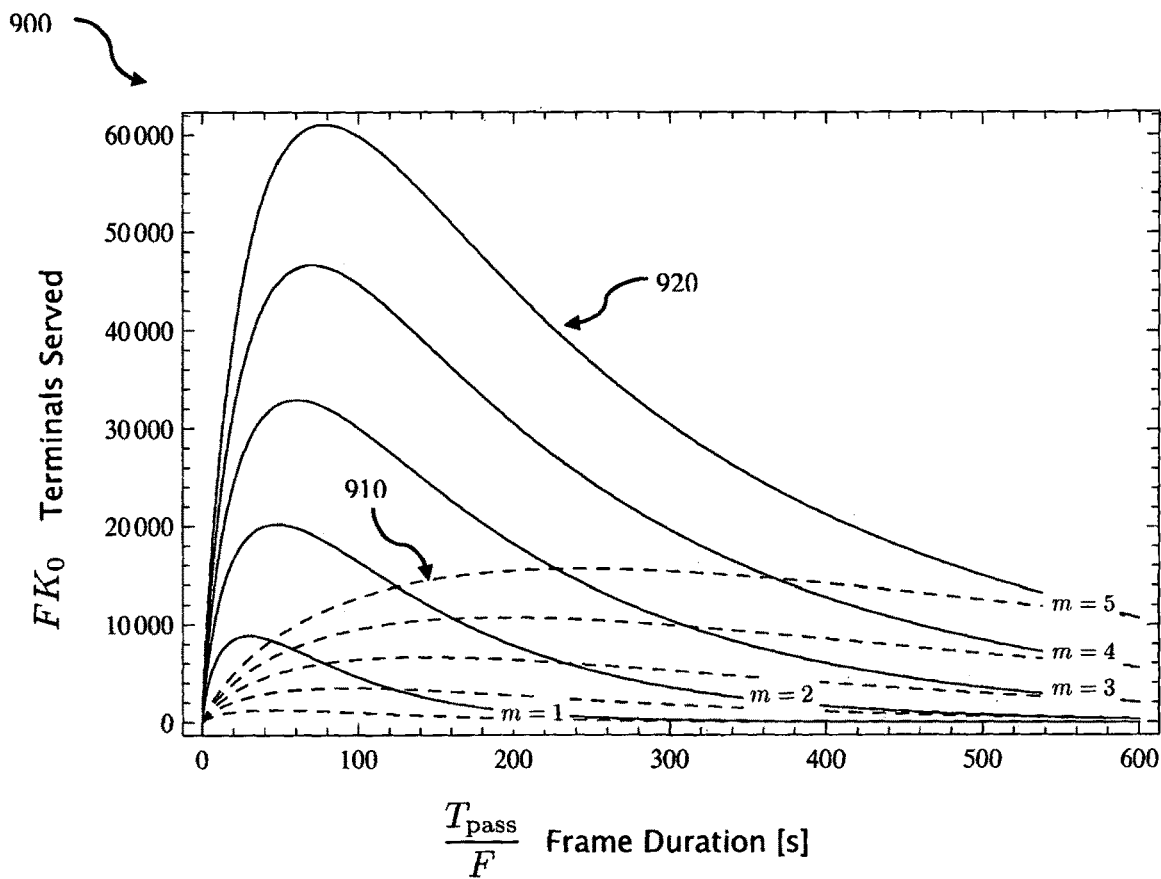
FIG. 9 is a plot of the maximum terminal population with and without acknowledgements.

FIG. 9 is a plot 900 of $FK_0$, the maximum number of terminals served versus the retransmission interval T. There are two groups of curves. Each pair of solid/dashed curves is labelled with m=1, 2, ..., 5, which is the multiuser decoding capability of the satellite. The dashed curves 910 correspond to an open loop system in which no acknowledgements or negative acknowledgements are used, and all terminals retransmit every frame. The solid curves 920 show the significant improvement obtained through the use of acknowledgements or negative acknowledgements. For both groups of curves, p=1, meaning that unacknowledged terminals retransmit with probability one.

System optimisation may be performed offline, or it may be continually updated online, as various system parameters change. This may be performed centrally by the receiver, or a network operations centre in communication with the receiver, and communicated to the terminals via a feedback channel 521, or it may be performed in a distributed manner by the terminals 522 using one of the methods described below. Various network (or system) parameters can be optimised (eg F, n, p). In one embodiment the system is optimised to maximise the number of supportable users $K=FK_0$. This can be achieved using equations (15) and (17). For example, given p, n, m, ε, we can numerically solve for the optimal value of $\lambda^*(p, m, \varepsilon)$ and subsequently determine the optimal F.

In many cases of interest, the product of number of slots per frame n, and the number of frames F may be a constant, $Fn@N$. For example, in a system based on time-division multiple access (TDMA), N might be the number of time slots available during one satellite pass. In a TDMA system with multiple frequency channels, N might be the product of the number of available time slots and the number of available frequency channels.

FIG. 9 shows just such an example, where $N=TP_{pass}/0.025$. The optimal frame duration $T_{pass}/F$ (and hence the optimal number of frames per pass) for each value of m can be read from FIG. 9. Fixing N=nF, we can optimise the number of frames F by maximising $K=K_0F$ from (17) as follows $$F^*(m, \varepsilon) = \underset{F}{\mathrm{argmax}}(1 - \varepsilon^{1/F})Q^{-1}(m, 1 - \varepsilon^{1/F}). \tag{20}$$

In the above, we removed terms that did not depend on the variable over which we are maximising. Setting $\alpha = 1 - \varepsilon^{1/F}$, we can equivalently find $$\alpha^*(m) = \underset{\alpha}{\mathrm{argmax}}\,\alpha Q^{-1}(m, \alpha) \tag{21}$$

for each integer value of m (which may be readily accomplished numerically using software such as Mathematica), and from this determine the optimal F* as $$F^*(m, \varepsilon) = \frac{\ln \varepsilon}{\ln(1 - \alpha^*(m))}. \tag{22}$$

This is just one example of numerical optimisation of the network (or system) parameters. Given other sets of fixed parameters, it is equally possible to optimise the remaining free parameters. For example, it may be desirable to minimise the failure probability ε given a particular user population K. Another example would minimise the multiuser decoding capability m required to support a given failure probability and user population. To someone skilled in the art, it is apparent that any such optimisations can be achieved using equations (15) and (17).

In the theory described above, we have assumed that each active terminal transmits with identical probability p. Allowing different active terminals to transmit with different probabilities provides an additional degree of flexibility for system optimisation. One possibility is to let the transmission probability depend on the state of the terminal, i.e. we now have that terminals is state i (which have previously failed i times) transmit with probability $p_i$. Analogous to (15), now let $$q_i = 1 - p_i Q\left(m, \frac{k}{n}\right) \tag{23}$$

be the probability that a terminal in state i fails when there are k terminals that choose to transmit in that frame. Using a similar development to that provided above, we can derive the following set of relations:

$$\varepsilon = \prod_{i=1}^{F-1} q_i \tag{24}$$

$$k = \sum_{i=0}^{F-1} p_i K_i$$

$$K_i = K_{i-1}q_{i-1} = K_0 \prod_{j=0}^{i-1} q_j$$

whereas before, ε is the overall failure probability (the probability that a terminal fails after F attempts), k is the number of terminals that attempt to transmit each frame, and $K_i$ is the number of terminals in state i.

We can now perform various advantageous system optimisations. For example, we may choose to maximise $K_0$ or to minimise ε. However this is not straightforward, as the dependence of $q_i$ on k which depends on the $p_i$ and $K_i$, which in turn depend on the $q_i$ creates an "endless loop" of back substitutions.

We have found a way to break this loop. For example, if we wish to maximise $K_0$ (the number of new terminals arriving into the field of view) for a fixed failure probability ε (and fixed m, n), we use numerical methods to solve $$\underset{k, \{K_i, p_i, i=0, \ldots, F-1\}}{\max} K_0 \tag{25}$$

subject to $$k = \sum_{i=0}^{F-1} p_i K_i \tag{26}$$

$$\varepsilon \geq \prod_{i=1}^{F-1}\left(1 - p_i Q\left(m, \frac{k}{n}\right)\right) \tag{27}$$

$$K_i = K_0 \prod_{j=0}^{i-1}\left(1 - p_j Q\left(m, \frac{k}{n}\right)\right) \tag{28}$$

The introduction of the additional optimisation variable k breaks the undesirable "loop". Note that (27) can be replaced by $$\varepsilon \geq \frac{K_{F-1}}{K_0}\left(1 - p_{F-1}Q\left(m, \frac{k}{n}\right)\right) \tag{29}$$

since is can be shown that the right hand side is an alternative expression for the failure probability. Similarly, we could minimise the failure probability for a fixed $K_0=K_0^*$:

$$\underset{k, \{K_i, p_i, i=0, \ldots, F-1\}}{\min} \frac{K_{F-1}}{K_0}\left(1 - p_{F-1}Q\left(m, \frac{k}{n}\right)\right) \tag{30}$$

subject to $$k = \sum_{i=0}^{F-1} p_i K_i \quad (31)$$

$$K_i = K_0 \prod_{j=0}^{i-1} \left(1 - p_j Q\left(m, \frac{k}{n}\right)\right) \quad (32)$$

$$K_0 = K_0^* \quad (33)$$

It will be apparent to someone skilled in the art that many other optimisations are enabled by the framework that we have established. For example, we could seek to minimise $$\frac{T}{k} \sum_i i p_i K_i \quad (34)$$

which is the average "age" of the successfully decoded packets.

In embodiments where optimisation of network parameters is performed in a distributed manner by the terminals, the multiuser receiver can provide information (for example over feedback channels), to assist terminals. In one embodiment, the multiuser receiver broadcasts a signal which indicates the current system load such as the number of terminals K in the field of view. This can be used by the terminals to adapt the various system parameters, such as the number of frames F, the number of slots per frame n, or the probability of transmitting p. As described above, these may all be optimised for a wide range of system objectives, according to equations (15) and (17), or via (optionally tabulated) solutions to (21) and (22). The advantage is that these parameters may be optimised online, during system operation, rather than being set once and for all ahead of time. Alternatively, the terminals can also estimate the system load K implicitly, via counting the number of acknowledgments (or negative acknowledgements) transmitted in a frame. As described above, this information can be used to adapt the network (or system) parameters.

As discussed above, the system parameters may be optimised, either offline ahead of time, or in an online mode of adaptation. The optimisation may be centralised, taking place collocated with the receiver, or it may be distributed, taking place in the terminals. Note that with distributed optimisation, each terminal may have a different value of F and n. However, as the slot boundaries are still the same and each terminal will still be able to interpret acknowledgments addressed either to its identification number or to a particular slot number, this is unlikely to adversely affect the system. Rather, the effect is likely to be a slightly less optimal system (compared to one in which all terminals used the same values) and that different terminals may end up repeating their failed packets with different periods.

The system may be configured according to the system architecture described in Australian Provisional Patent Application No. 2012903489 titled "COMMUNICATION SYSTEM AND METHOD" filed on 21 Sep. 2012. The various features of the system described may be implemented using a variety of hardware components, and may be integrated into existing hardware components and devices, or added onto existing hardware components and devices.

Figure 10:
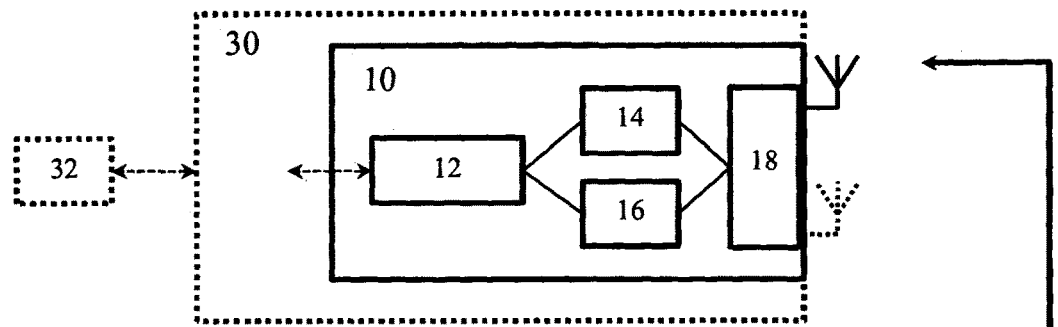
FIG. 10 is a schematic diagram of components of a communication system according to an embodiment.
Figure 10:
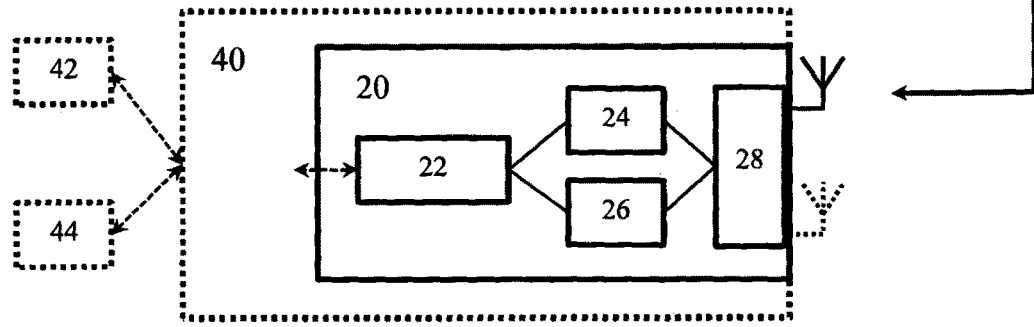

FIG. 10 is a schematic diagram of components of a communication system according to an embodiment. The multi-access receiver 10 comprises a communications module 18 comprising a receiver for simultaneously receiving m transmissions, a transmitter (which may be combined in a transceiver), one or more antennas, a multiuser decoder 14, an encoder 16, a processor 12 and associated memory for controlling the operation of the multiuse receiver such as decoding signals, generating acknowledgments, performing system optimisation, and any other supporting operations. The multi-access receiver may be a standalone module or device, or it may be integrated with an existing platform or device 30. The multi-access receiver may be mounted on a platform such as a LEO satellite, a UAV, an aircraft or other vessel. The supporting platform may provide system resources, such as processing support (eg for optimisation) or be in communication with other devices or systems 32.

A terminal 20 comprises a communications module comprising 28 a transmitter, a receiver (which may be combined in a transceiver) and one or more antennas, an encoder 24, decoder 26, and a processor 22 and associated memory for controlling the operation mode of the terminal, processing acknowledgement messages, selecting slots to use, performing system optimisation and any other supporting operations. The terminals may be a standalone device with a communication means for transmitting and receiving data from an external sensor or device, a module or board for connecting to a sensor or device, or it may be integrated into an existing sensor or device 40, such as in the form of a communication chipset which stores protocols, data, code, instructions, etc to enable the sensor or device to communicate via the system. The sensor or device 40 may connected to other sensors 42 or other devices 44.

The multi-access receiver and the terminals may each comprise a receiver and a transmitter, and communicate using an agreed protocol. The receiver performs receiver related functions such as down conversion, filtering, synchronisation, initial acquisition, channel estimation, demodulation, de-interleaving, and decoding. Iterative techniques including iterative decoding may be performed to obtain improved estimates of the channel parameters and transmitted symbols. The multi-access receiver may implement techniques such as iterative soft interference cancellation, such as that described in Australian Provisional Patent Application No. 2013903163 titled "Multiuser communication system" filed on 21 Aug. 2013, the entire content of which is hereby incorporated by reference. Iterative soft interference cancellation may comprise attempting to acquire one or more users in the residual signal, and for each new user acquired, estimating a set of channel parameters for the user, and adding the new user to a set of acquired users. The receiver may then attempt to decode the residual signal for each user in the set of acquired users using the current channel parameters for the user to generate a soft estimate of the signal contribution from the user and updated channel parameters for the user. The residual signal can then be updated by subtracting the soft estimate of the signal contribution for each user from the residual signal, and the process can be repeated until a termination condition is met. A transmitter may add an acquisition signal to assist the receiver in initial acquisition of the signal. The transmitter performs transmission related functions such digital-to-analog conversion, filtering and modulation onto the selected carrier using an appropriate a modulation scheme (PSK, QAM, GMSK, OFDM etc). The transmitter may also implement functionality such as error control coding, interleaving, insertion of pilot data etc to assist in increasing the robustness of the transmission to channel effects, interference, and other noise sources. In one embodiment transmissions are relatively short and occupy a relatively narrow bandwidth (eg 1, 2, 5, 10, 20, 40 kHz etc) in the VHF or UHF band.

Embodiments of the communication system which uses feedback from the multiuser receiver to signal to terminals whether or not their packet was successfully received. This signal could be an acknowledgement (signal sent to terminals whose packets were successfully received), or a negative acknowledgement (sent to terminals whose packets were not successfully received). Further, the operational modes of the terminals are configured so that if a terminal receives an acknowledgement (or does not receive a negative acknowledgement), it moves to an inactive state, and either does not re-transmit while in the field of view, or has a reduced probability of transmitting again whilst in the field of view. Further, by the use of beacon or ephemeris data, terminals can determine if they are in the field of view of not. Terminals can enter a wait state whilst out of the field of view, and re-enter an active state when they re-enter the field of view of the receiver (or another receiver) and have a packet to send.

The mathematical developments discussed above clearly demonstrate the advantage of using acknowledgements to increase system capacity, or to decrease failure probability, or to decrease the number of slots required to support a given terminal population. In particular, equation (18) quantifies the capacity improvement for a fixed failure probability compared to the case where acknowledgements are not used. The absolute size of this improvement can be considerable, as demonstrated in FIGS. 8 and 9. Further, the system can be optimised during use, and reconfigured to optimise different network parameters.

The system may also be varied to support different applications. For example, in one embodiment, a LEO satellite with a multiuser receiver can be used to support 1,000,000 distributed terminals or more. Each frame may be comprised of 1000 25 ms time slots, and each terminal may remain in the field of view for a period of about 10 minutes (600 seconds). In other embodiments, the receiver may be located on an airborne (eg UAV) or maritime platform. In such cases the time in the field of view may be longer (30 minutes, 60 minutes, 2 hours, 5 hours, 10 hours, 24 hours, etc) or less (1 minute, 2 minutes, 5 minutes). The length of slot times may also be allowed to vary (eg 1 ms, 10 ms, 20 ms, 25 ms, 30 ms, 40 ms, 50 ms, 100 ms, 250 ms, 500 ms, 1 s etc). Acknowledgment messages may be predictive, they may be compressed (eg slot specific or hashed terminal identifiers), and they may be used by other terminals to determine system load or to assist in slot selection.

Embodiments of a multi-access communication system have been described which are particularly suited for supporting widely distributed sensor and devices, such as terrestrial and maritime field sensors and industrial automation and control equipment. The capability to support such devices and sensors has the potential to deliver significant economic and environmental benefits in areas such as environmental monitoring for climate change, water, mining, agriculture, defence and national security. For example, potential applications include supporting communications with long range oceanic environmental monitoring for environmental, economic and national security reasons. For such sensors satellite or airborne communications is the only feasible solution for command, control and extraction of such sensor data. Another application is for supporting unattended ground sensors for remote monitoring. Such sensors can report to a passing satellite when interrogated. A further application is the monitoring and control of remote assets for the mining industry. Large fleets of drill rigs in remote locations currently have little or no connection to the outside world, mainly due to the high cost of existing communications systems. Remote control and monitoring of these rigs supports business decisions and optimisation (eg reducing fuel consumption, visibility for planned maintenance, reduction of downtime, etc).

Many of these high-value applications have modest data rate requirements (kilobits per second), and can tolerate intermittent communications with latency of up to several hours or even days. Frequently, applications involve sensors in very remote areas where terrestrial communication solutions do not exist, are unreliable, are denied or insecure (eg in a defence context). These constraints favour the use of satellite or airborne communications. As existing commercial satellite services were typically designed for other applications, they do not provide cost effective support for such sensors and devices. In contrast embodiments of communication systems described can be used to enable or at least provide improved communications with such sensors and devices.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. A central processing unit (CPU) may be used, containing an Input/Output Interface, an Arithmetic and Logic Unit (ALU) and a Control Unit and Program Counter element which is in communication with input and output devices or modules through the Input/Output Interface, and a memory. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention. For the purpose of example, numerous specific details are set forth in the description above in order to provide a thorough understanding of the present invention. The present invention may be practised according to the claims without some or all of these specific details. For the purpose of clarity, technical material that is known in the technical fields related to the invention has not been described in detail so that the present invention is not unnecessarily obscured.

The invention claimed is:

1. A method for optimizing a network parameter in a set of network parameters in a multiple access wireless communication system comprising a plurality of terminals and a multi-access receiver which communicates using a frame comprising a plurality of slots, wherein each terminal has an active state for transmitting, and an inactive state during which the terminal is prevented from transmitting, and stores a probability of transmission p which, during an active state, the terminal uses to determine whether to transmit in a frame, and the multi-access receiver has a first field of view and is configured to successfully decode up to m transmissions in each slot of a frame from terminals in the field of view, wherein the network parameters comprise (p, n, m, ε) where p is the probability of an active terminal deciding to transmit in a frame when in the active state, n is the number of slots per frame, m is the number of simultaneous transmissions that a multiuser can successfully decode in a single slot, and ε is the probability of failure of a terminal to successfully transmit a message whilst in a field of view of the multiple access receiver, and the method of optimising a network parameter comprising:
   selecting the network parameter and numerically solving $q=1-pQ(m,\lambda)$ and $$K_0 = \frac{1-\varepsilon^{1/F}}{1-\varepsilon}\lambda^*n$$

to optimise $\lambda^*$ where $1-q$ is the proportion of terminals that succeed in transmitting in a frame and Q is the gamma function, $K_0$ is the number of new terminals that enter the field of view each frame, F is the number of frames a terminal is in the field of view for, $\lambda=k/n$ and $k=pK$ and where K is the number of active terminals in the field of view; and
   updating the optimized network parameter in at least one of the multi-access receiver and the plurality of terminals.

2. The method as claimed in claim 1, wherein the method is performed by the receiver and the receiver transmits changes to the system parameters to the plurality of terminals.

3. The method as claimed in claim 1, wherein the method is performed as distributed optimization method in each of the plurality of terminals.

4. The method as claimed in claim 3, wherein the receiver transmits K the number of active terminals in the field of view to the terminals.

5. The method as claimed in claim 3, wherein each terminal estimates K, the number of active terminals in the field of view by counting the number of acknowledgement messages transmitted during a frame.

6. The method as claimed in claim 1, wherein the transmission probability depends upon the number of failed transmission attempts.

7. A multi-access receiver for use in a multiple access wireless communication system comprising:
   a plurality of terminals; and
   a multi-access receiver,
   wherein each terminal comprises:
      a transmitter configured to transmit a message during a slot of a frame to the multi-access receiver when in an active state,
      a memory, and
      a terminal processor,
      wherein when the terminal is in an active state the transmitter is permitted to transmit a message and when the terminal is in an inactive state the transmitter is prevented from transmitting, and the memory configured to store a probability of transmission p which during an active state, the terminal processor uses to determine whether to transmit in a frame; and
   the multi-access receiver comprises:
      a receiver for simultaneously receive m transmissions in each slot of a frame, and
      a multiuser decoder for decoding the received transmissions; and
      a multi-access receiver processor,
      wherein the multi-access receiver processor is configured to perform a method for optimizing a network parameter in a set of network parameters, wherein the network parameters comprise (p, n, m, ε) where p is the probability of an active terminal deciding to transmit in a frame, n is the number of slots per frame, m is the number of simultaneous transmissions that a multiuser can successfully decode in a single slot, and ε is the probability of failure of a terminal to successfully transmit a message whilst in a field of view of the multiple access receiver, and the method of optimising a network parameter comprising:
         selecting the network parameter and numerically solving $q=1-pQ(m,\lambda)$ and $$K_0 = \frac{1-\varepsilon^{1/F}}{1-\varepsilon}\lambda^* n$$

to optimise λ* where 1−q is the proportion of terminals that succeed in transmitting in a frame and Q is the gamma function, $K_0$ is the number of new terminals that enter the field of view each frame, F is the number of frames a terminal is in the field of view for, λ=k/n and k=pK and where K is the number of active terminals in the field of view; and transmit transmitting the optimized network parameter to the plurality of terminals.

8. The multi-access receiver as claimed in claim 7 wherein the transmission probability depends upon the number of failed transmission attempts.

9. A terminal for use in a multiple access wireless communication system comprising:
   a plurality of terminals; and
   a multi-access receiver comprising:
      a receiver for simultaneously receive m transmissions in each slot of a frame; and
      a multiuser decoder for decoding the received transmissions,
   wherein each terminal comprises:
      a transmitter configured to transmit a message during a slot of a frame to the multi-access receiver when in an active state;
      a memory; and
      a processor,
      wherein the processor is configured to control the mode of operation of the terminal, and when the terminal is in an active state the terminal is permitted to transmit a message and when the terminal is in an inactive state the transmitter is prevented from transmitting, and the memory stores a probability of transmission p which during an active state, the processor uses to determine whether to transmit in a frame, and
      the processor is further configured to perform a method for optimizing a network parameter in a set of network parameters, wherein the network parameters comprise (p, n, m, ε) where p is the probability of an active terminal deciding to transmit in a frame, n is the number of slots per frame, m is the number of simultaneous transmissions that a multiuser can successfully decode in a single slot, and ε is the probability of failure of a terminal to successfully transmit a message whilst in a field of view of the multiple access receiver, and the method of optimising a network parameter comprising:
      selecting the network parameter and numerically solving q=1−pQ(m,λ) and $$K_0 = \frac{1-\varepsilon^{1/F}}{1-\varepsilon}\lambda^* n$$

to optimise λ* where 1−q is the proportion of terminals that succeed in transmitting in a frame and Q is the gamma function, $K_0$ is the number of new terminals that enter the field of view each frame, F is the number of frames a terminal is in the field of view for, λ=k/n and k=$_p$K and where K is the number of active terminals in the field of view.

10. The terminal as claimed in claim 9, wherein the multi-access receiver transmits K the number of active terminals in the field of view to the terminals.

11. The terminal as claimed in claim 9, wherein each terminal estimates K, the number of active terminals in the field of view by counting the number of acknowledgement messages transmitted during a frame.

12. The terminal as claimed in claim 9, wherein the transmission probability depends upon the number of failed transmission attempts.

13. A multiple access wireless communication system comprising:
   a plurality of terminals;
   a multi-access receiver; and
   a network operations center in communication with the multi-access receiver,
   wherein the multi-access receiver comprises:
      a receiver for simultaneously receive m transmissions in each slot of a frame; and
      a multiuser decoder for decoding the received transmissions, each terminal comprises:
      a transmitter configured to transmit a message during a slot of a frame to the multi-access receiver when in an active state,
      a memory, and
      a multi-access receiver processor,
      wherein when the terminal is in an active state the transmitter is permitted to transmit a message and when the terminal is in an inactive state the transmitter is prevented from transmitting, and the memory stores a probability of transmission p which during an active state, the multi-access receiver processor uses to determine whether to transmit in a frame, and
   the network operations center comprises:
      a network operations center processor configured to perform a method for optimizing a network parameter in a set of network parameters, wherein the network parameters comprise (p, n, m, ε) where p is the probability of an active terminal deciding to transmit in a frame, n is the number of slots per frame, m is the number of simultaneous transmissions that a multiuser can successfully decode in a single slot, and E is the probability of failure of a terminal to successfully transmit a message whilst in a field of view of the multiple access receiver, and the method of optimising a network parameter comprising:
      selecting the network parameter and numerically solving q=1−pQ(m,λ) and $$K_0 = \frac{1-\varepsilon^{1/F}}{1-\varepsilon}\lambda^* n$$

to optimise λ* where 1−q is the proportion of terminals that succeed in transmitting in a frame and Q is the gamma function, $K_0$ is the number of new terminals that enter the field of view each frame, F is the number of frames a terminal is in the field of view for, λ=k/n and k=pK and where K is the number of active terminals in the field of view; and communicating the optimized network parameter to the multi-access receiver for transmission to the plurality of terminals.

14. The multiple access wireless communication system as claimed in claim 13, wherein the transmission probability depends upon the number of failed transmission attempts.

* * * * *